United States Patent [19]

Benedict

[11] 4,398,085
[45] Aug. 9, 1983

[54] UNIVERSAL TIMING ARRAY

[75] Inventor: Douglas M. Benedict, Santa Monica, Calif.

[73] Assignee: The United States of America as represented by the Secretary of the Air Force, Washington, D.C.

[21] Appl. No.: 210,476

[22] Filed: Nov. 25, 1980

[51] Int. Cl.³ .............................................. G04F 5/00
[52] U.S. Cl. .................................... 377/20; 364/900; 377/2; 377/27
[58] Field of Search ................ 364/900 MS File, 569; 235/92 TF, 92 T

[56] References Cited

U.S. PATENT DOCUMENTS

| | | | |
|---|---|---|---|
| 3,757,306 | 9/1973 | Boone | 340/172.5 |
| 3,925,684 | 12/1975 | Gaskill, Jr. | 307/205 |
| 4,035,777 | 7/1977 | Moreton | 364/200 |
| 4,195,339 | 3/1980 | Smith et al. | 364/900 |

Primary Examiner—Joseph A. Orsino, Jr.
Attorney, Agent, or Firm—Donald J. Singer; Willard R. Matthews

[57] ABSTRACT

A universal timing array (UTA) comprising a branch and increment logic circuit and multiple 2-bit counter cells is fabricated as a single large scale integrated circuit and is adapted to implementing various timing and control functions in digital computers and radar signal processors. Implementation of the UTA functional design using emitter coupled logic circuitry and special circuit design features improves UTA performance by increasing operating clock frequency, widening operating temperature range and reducing on-chip complexity. A specific embodiment utilizes a standard universal digital array chip having specially selected cell placements and interconnecting routing patterns.

14 Claims, 50 Drawing Figures

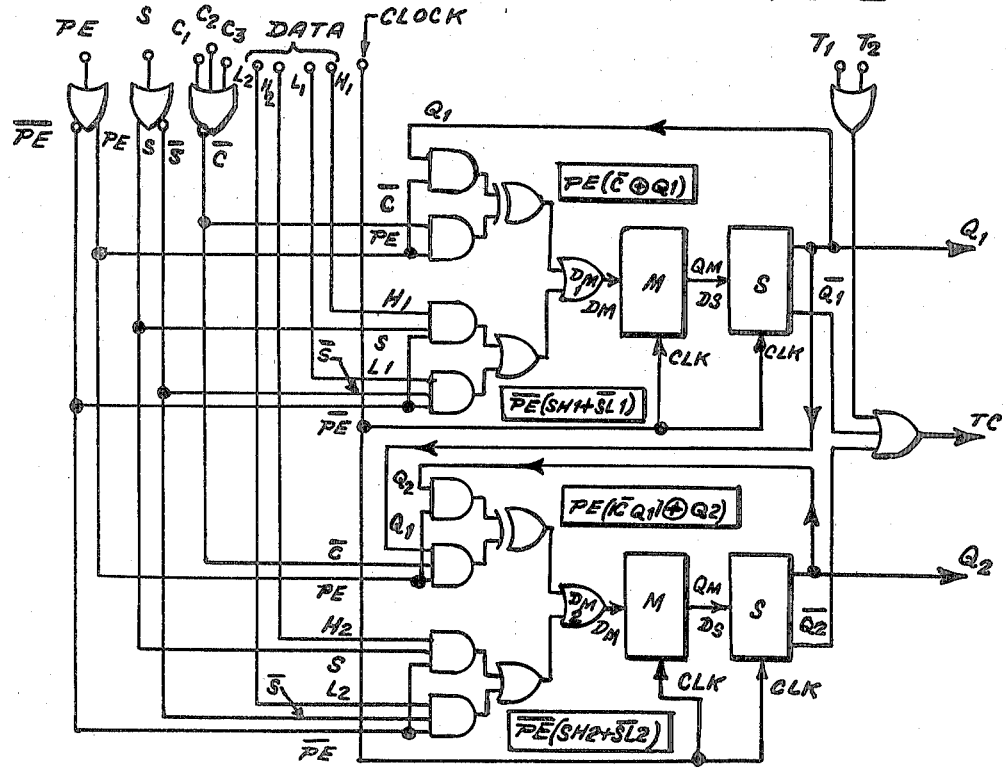
FIG.2
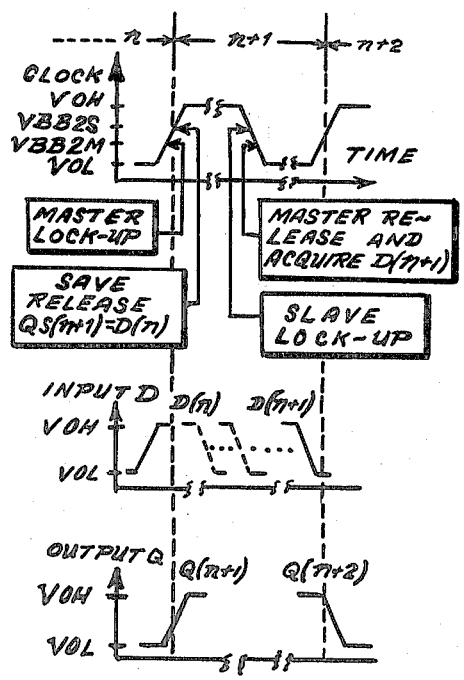
FIG.2a
FIG.2b

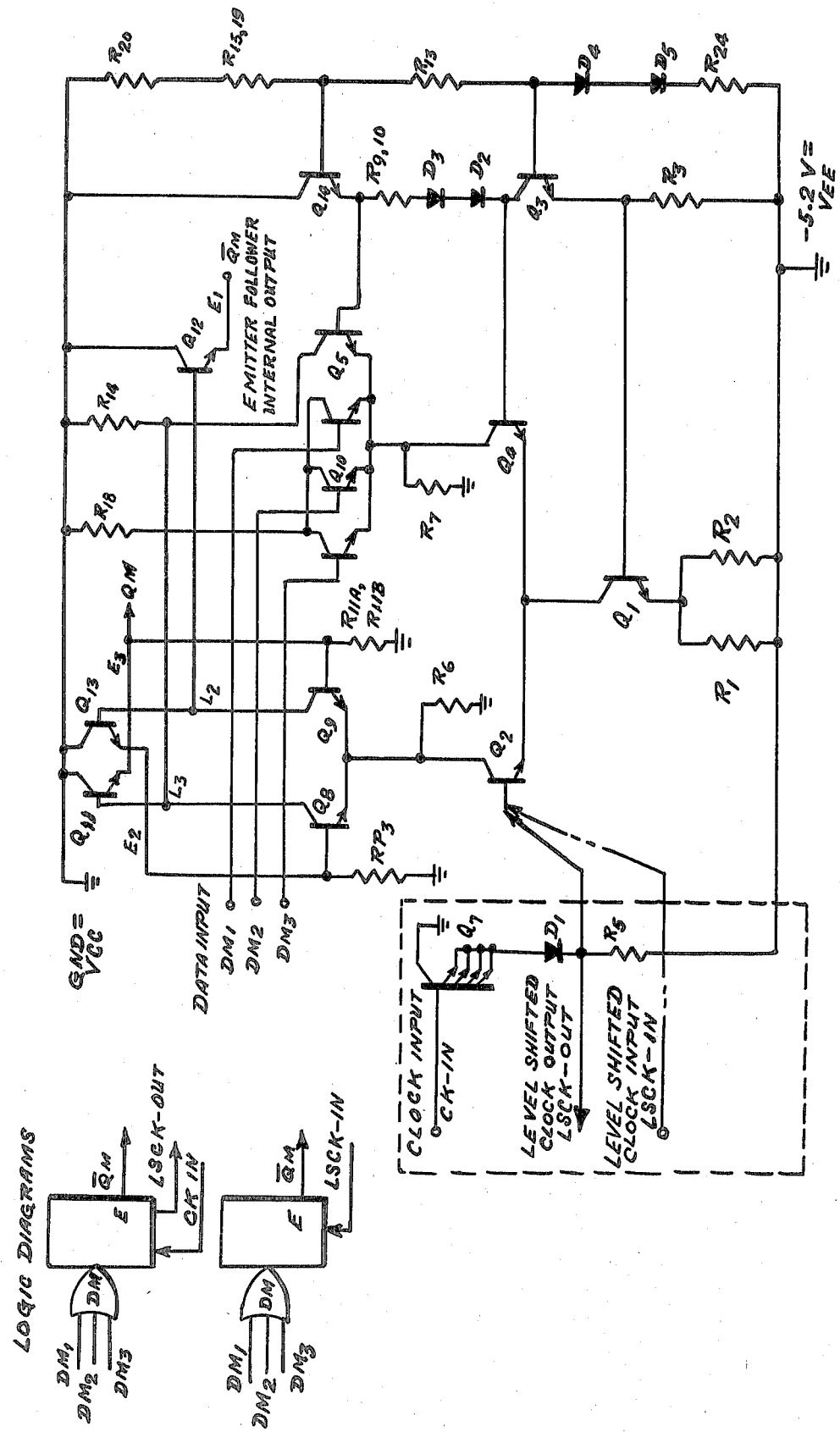

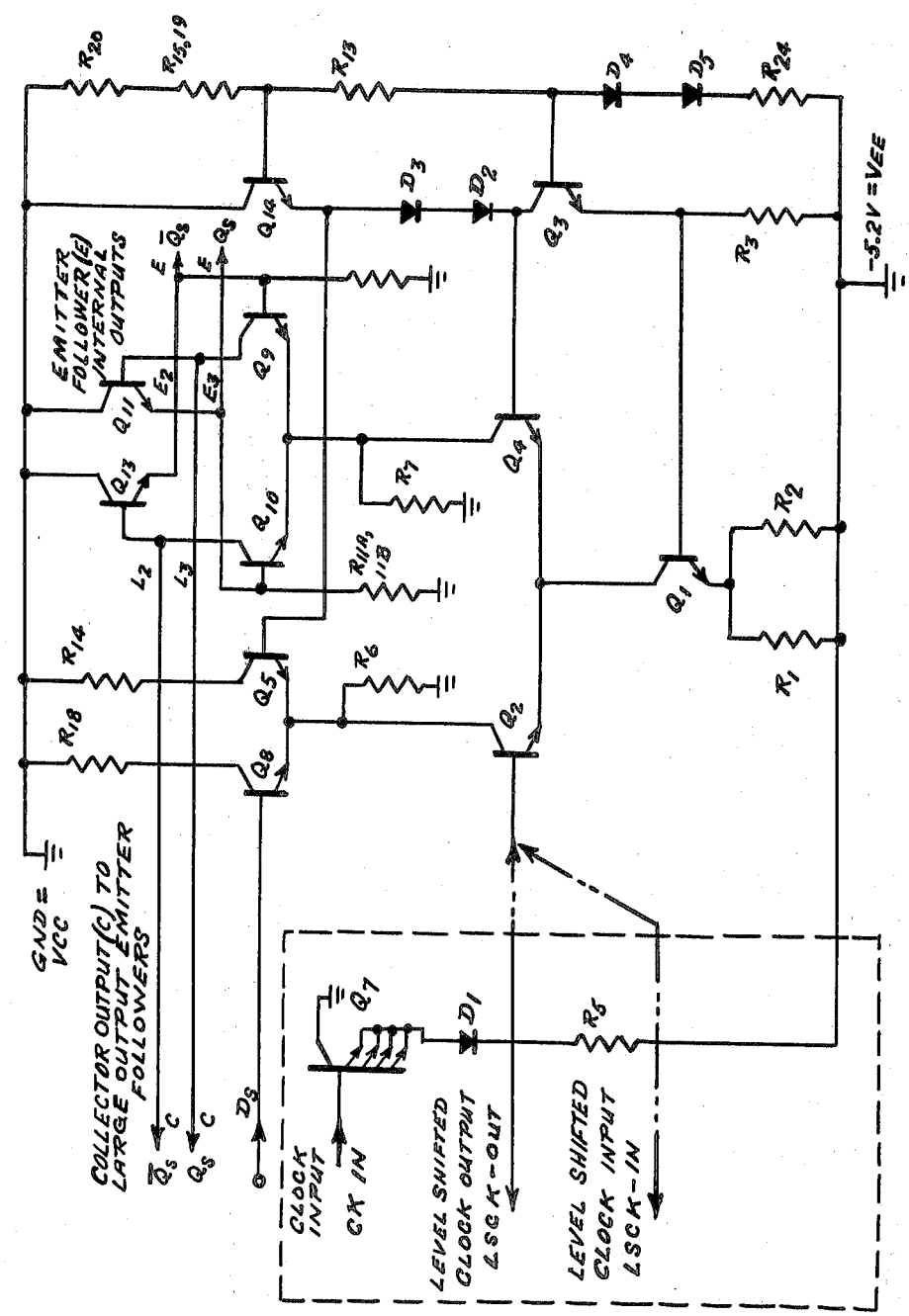
FIG. 5
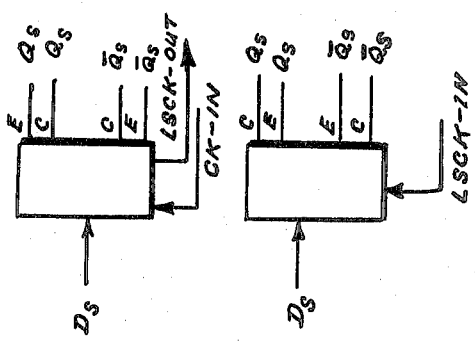
LOGIC DIAGRAMS

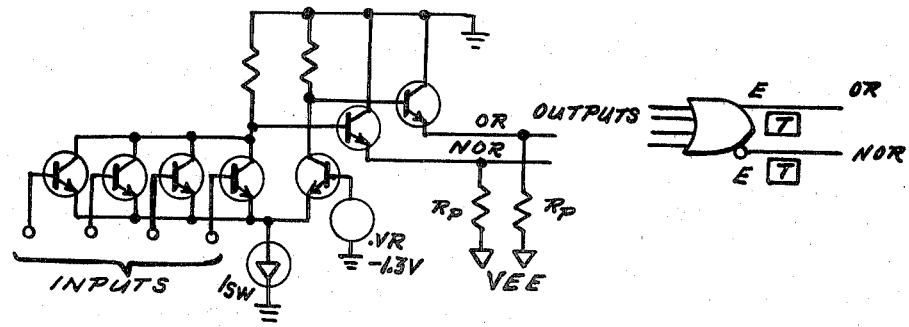
FIG. 7a
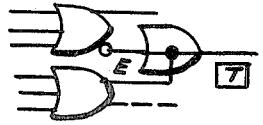
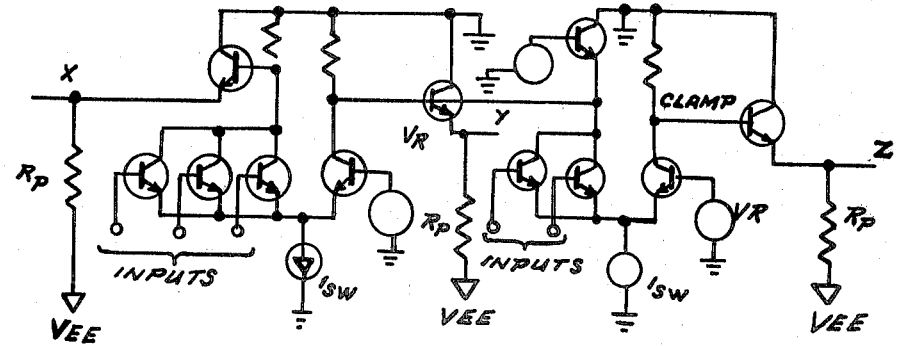
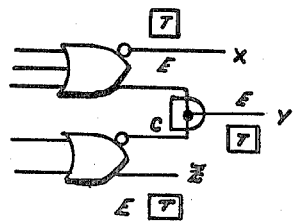
FIG. 7b

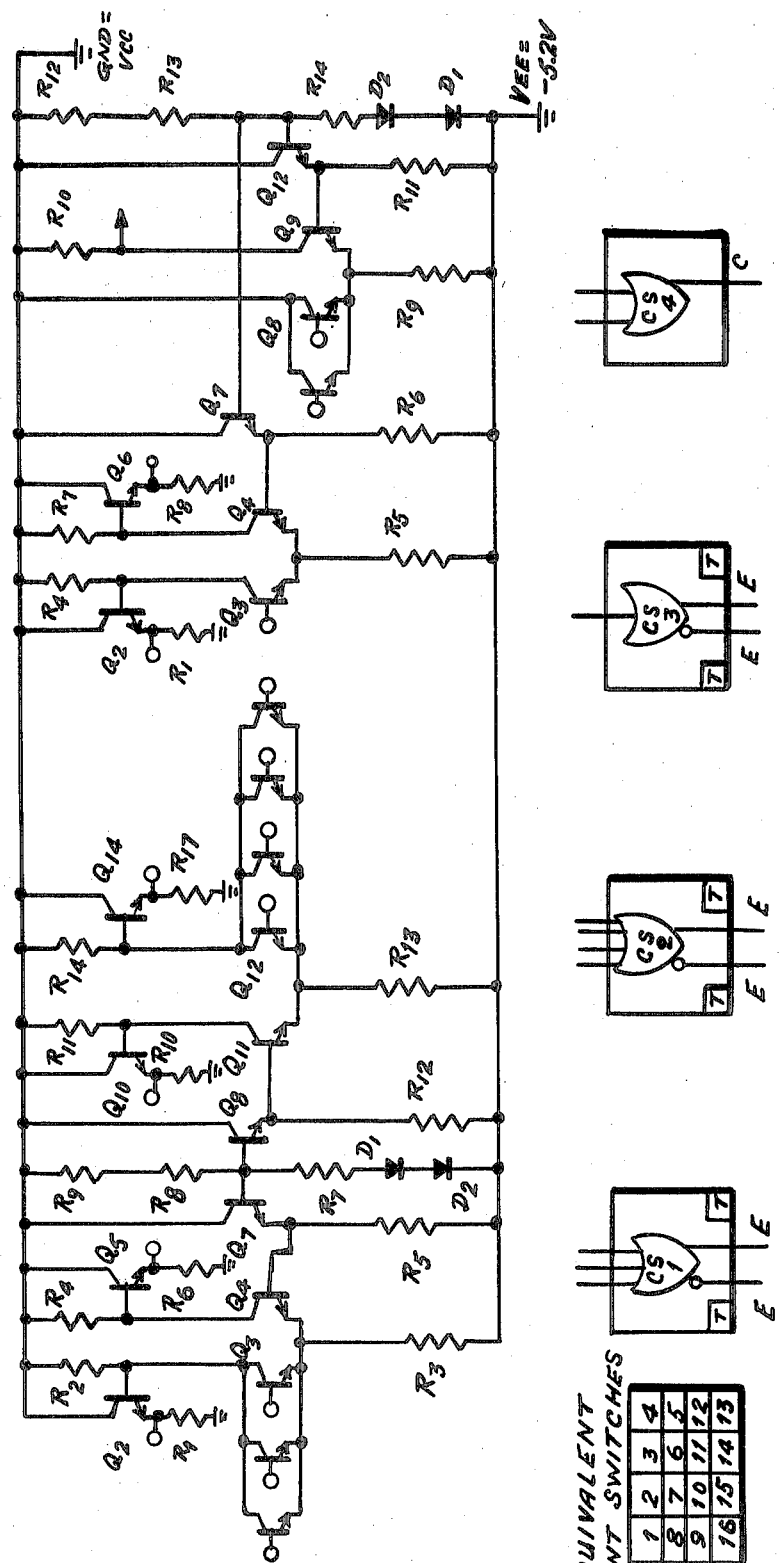

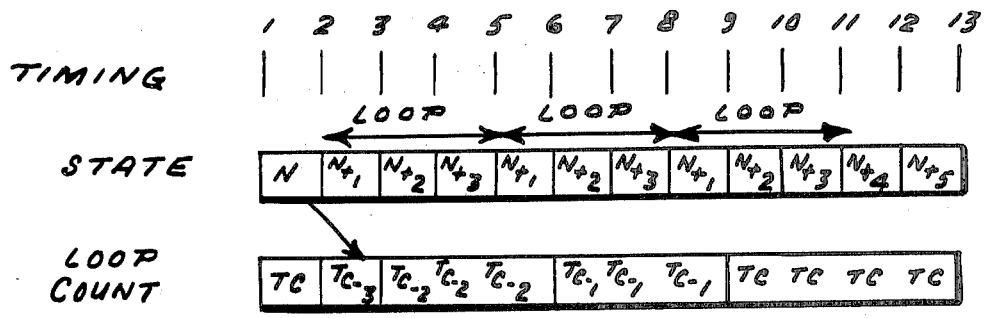
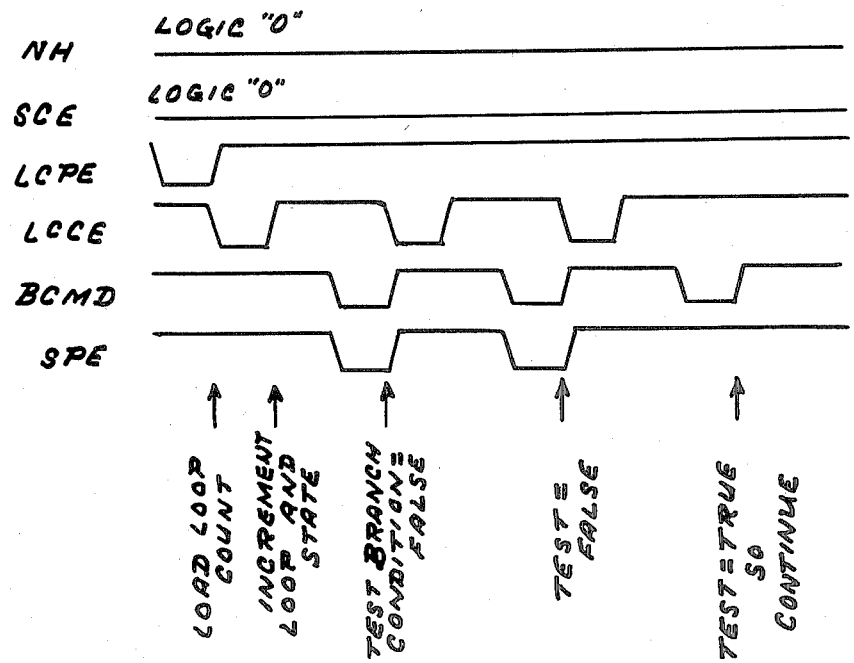
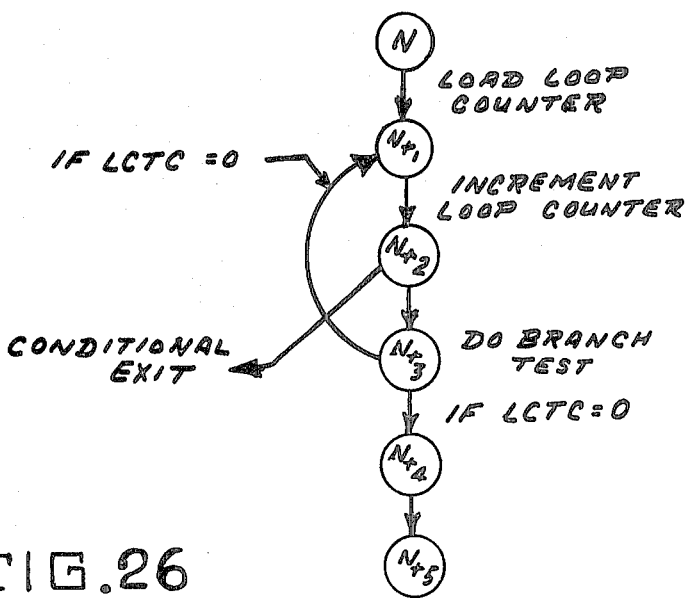
FIG. 26

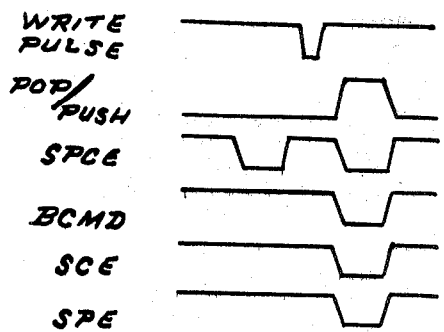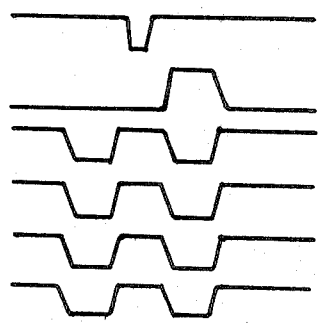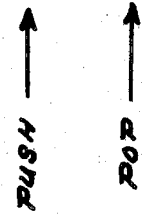
FIG.30a
FIG.30b
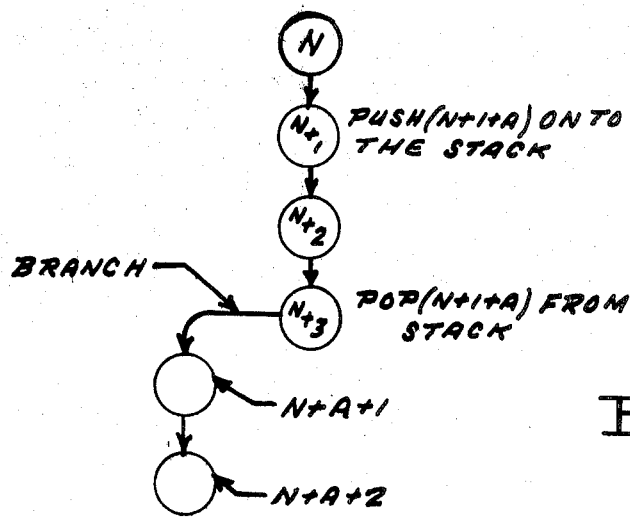
FIG.30

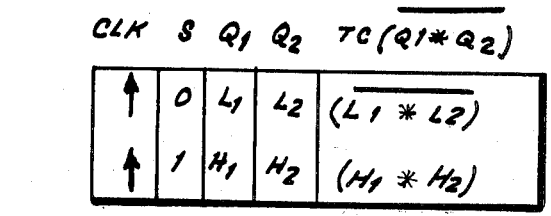
FIG. 31a
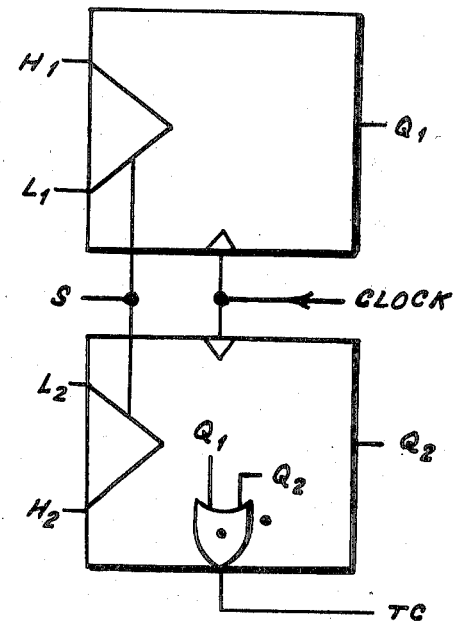
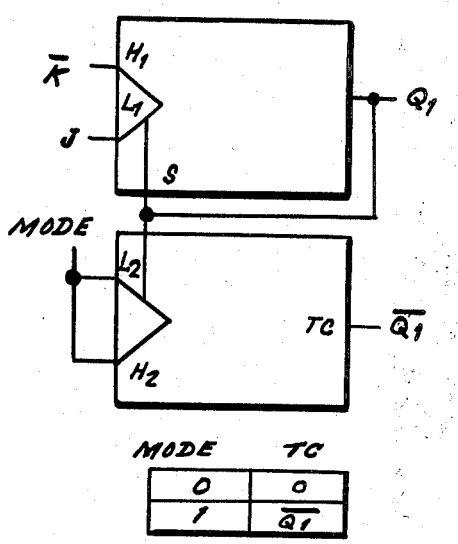
FIG. 31b
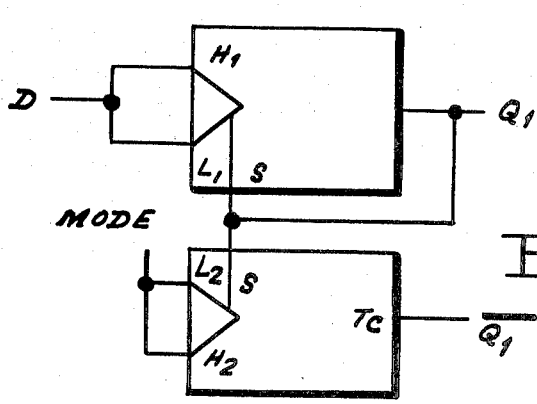
FIG. 31c

UNIVERSAL TIMING ARRAY

STATEMENT OF GOVERNMENT INTEREST

The invention described herein may be manufactured and used by or for the Government for governmental purposes without the payment of any royalty thereon.

BACKGROUND OF THE INVENTION

This invention relates to large scale integrated (LSI) circuit logic networks and in particular to a single element logic circuit device that can be adapted to implementing various timing and control functions in digital computers and radar signal processors.

All of the universal timing array (UTA) functions comprehended by the invention are realizable using equivalent networks of commercially available integrated circuits. However, more part types and also a greater number of integrated circuits generally are required in these networks. Furthermore, many of these functions are commonly implemented with small scale (SSI) and medium scale (MSI) integrated parts. Using LSI parts to replace larger numbers of MSI parts generally reduces complexity and cost of the equipment in which they are used. Defining and using a single multipurpose LSI part to replace several MSI parts in many different applications is more advantageous particularly in manufacturing radar signal processors. Radar systems and their signal processor components currently are built in relatively small (e.g. 100 to 1000) total quantities over several (e.g. 5 to 10) years. Thus defining a multi-purpose LSI part makes the part more usable (e.g. 100 times) in each signal processor unit. Resulting higher total usage (e.g. in 10,000 to 100,000 quantities) reduces both LSI part recurring and amortised nonrecurring costs and raises part reliability by larger quantity IC fabrication.

It is also noted that commercially available LSI (e.g. bit sliced) microprocessors can perform many of UTA micro-controller functions. However, as indicated above, using commercial medium or small scale integrated parts and/or LSI microprocessors instead of UTAs generally would increase the number of parts and/or the number of part types in otherwise functionally identical timing and control networks. Using the UTA in digital equipment reduces the number of ICs used because several (e.g. 3 to 5) medium or small scale integrated circuit parts are required to duplicate an LSI UTA function. Using fewer ICs improves reliability and lowers unit cost and complexity.

A second benefit of UTA application is a reduction of the number of part types used in a digital unit. The number of part types required is reduced because the UTA is a multipurpose part designed to meet several different applications requirements.

Because the UTA is designed for multiple applications, it can be used more extensively in each digital unit (e.g. signal processor) in addition to part type inventory reduction. As a result the total number of UTA parts per unit is increased and likewise the total number of UTA parts fabricated. Higher quantity UTA fabrication lowers per unit IC cost and increases IC reliability.

Relative to alternative circuit designs used in similar counters or microprocessors, UTA internal ECL circuit designs improve UTA performance, widen UTA operation temperature range, and lower UTA on-chip complexity.

SUMMARY OF THE INVENTION

The invention is directed to a universal timing array useful for implementing many different timing and control functions in digital computers and radar signal processors. The UTA is constructed as a single large scale integrated circuit consisting of four 2-bit counter cells and a branch and increment logic circuit. Each counter cell is fed by control, data and clock input signals and generates two Q output signals and a terminal count output signal. The branch and increment logic circuit receives synchronization, clock, branch command, branch condition, substrate terminal count and no-hold input signals and outputs a state count enable signal, complemented and uncomplemented substrate parallel entry signals and state parallel entry signals. Emitter coupled logic circuitry is used to improve UTA performance and includes a multimaster single slave flip flop counter cell and branch increment logic design that incorporates cascode or series gate ECL circuits. The UTA-LSI is achieved using a standard reconfigurable 48 cell universal digital array LSI chip having specific cell placement and interconnection layout. The UTA is designed to replace larger numbers of medium scale intergrated parts to reduce complexity and cost of equipment in which they are used.

It is a principle object of the invention to provide a universal timing array for implementing various timing and control functions in digital computers and radar signal processors.

It is another object of the invention to provide a UTA having fewer parts and/or number of part types than are required in otherwise functionally identical timing and control networks.

It is another object of the invention to provide a UTA for use in digital equipment that reduces the number of integrated circuits used and that consequently improves reliability and lowers unit cost and complexity.

It is another object of the invention to provide a UTA that is a multipurpose part designed to meet several different application requirements.

It is another object of the invention to provide a UTA having ECL circuit designs which improve UTA performance, widen UTA operating temperature range, and lower UTA on-chip complexity.

These together with other objects, features and advantages will become more readily apparent from the following detailed description when taken in conjunction with the illustrative embodiments in the accompanying drawings.

DESCRIPTION OF THE DRAWINGS

FIG. 2 is a functional logic circuit of a count cell of FIG. 1;

FIG. 2a is a table showing operation of the count cell;

FIG. 2b is a timing diagram of the count cell;

FIG. 3b is an equivalent logic diagram of the logic diagram of FIG. 3a;

FIG. 4 is a schematic diagram of the master latch circuit utilized in the UTA;

FIG. 5 is a schematic diagram of the slave latch circuit utilized in the UTA;

FIG. 7a is a schematic diagram of a first current-switch emitter follower circuit utilized in the UTA;

FIG. 7b is a schematic diagram of a second current-switch emitter follower circuit utilized in the UTA;

FIG. 13 is a schematic diagram illustrating connections used to configure peripheral current switches;

FIG. 18b illustrate the timing diagram for the logic diagram of FIG. 18a;

FIG. 20b is a state diagram of the microcontroller of FIG. 20a;

FIG. 26 illustrates state and timing diagram for microcontroller looping;

FIG. 30a shows the timing diagram for a microcontroller with relative branching;

FIG. 30b is a state diagram for the microcontroller of FIG. 30a;

FIG. 31a illustrates a multiplexing register;

FIG. 31b illustrates a J-K flip flop;

FIG. 31c illustrates a D flip flop;

DETAILED DESCRIPTION OF THE PREFERRED EMBODIMENTS

General Description Of The Invention

Figure 1:
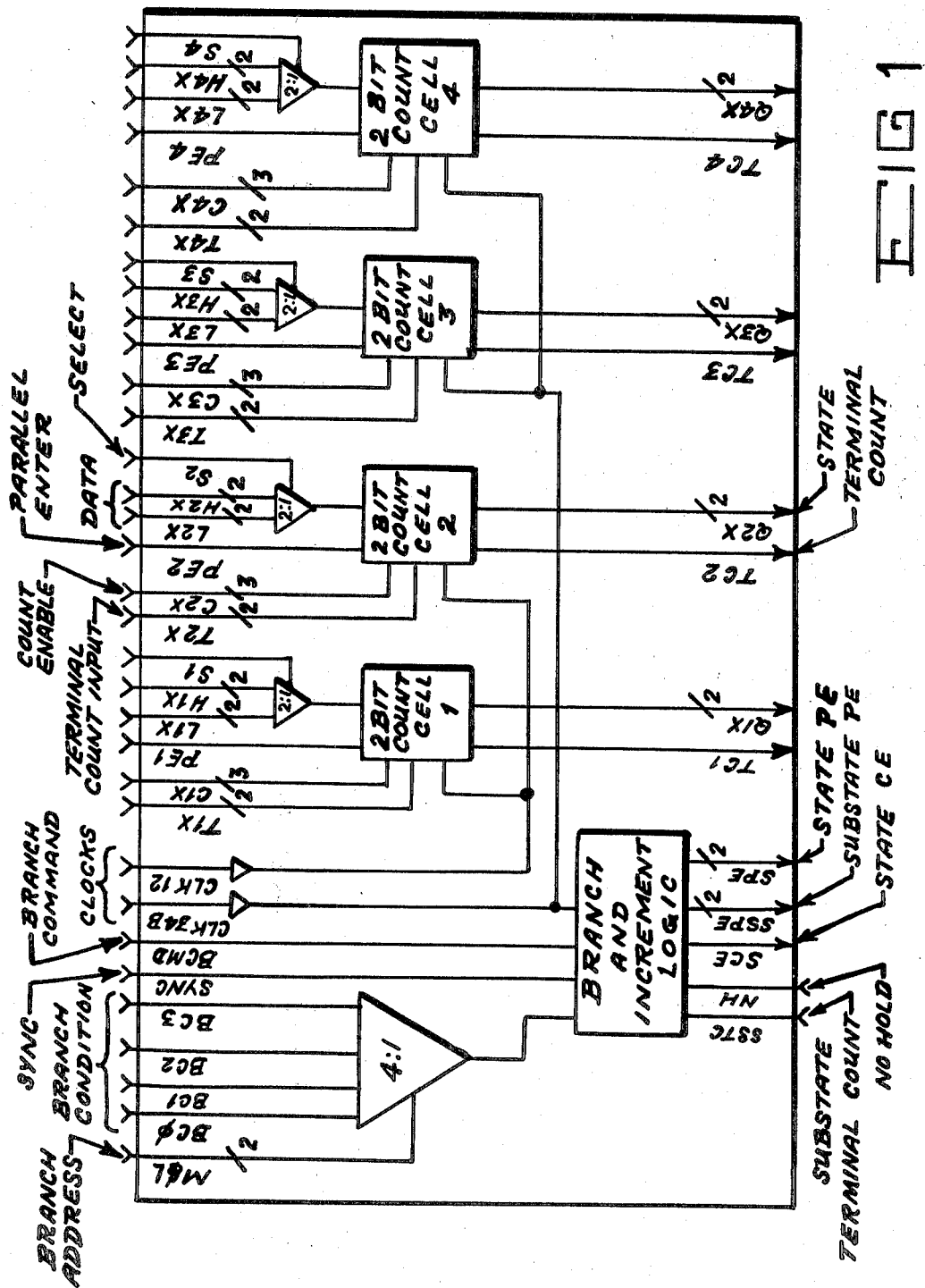
FIG. 1 is a functional block design of the UTA of the invention.

The universal timing array (UTA) of the invention is a logic network consisting of four 2-bit counter cells plus a branch and increment logic circuit. These elements and their interconnections are shown in FIG. 1, the UTA Block Diagram. The UTA was built as a single large scale integrated (LSI) circuit. This LSI circuit can implement many different timing and control functions in digital computers and radar signal processors. With various external connections one or several identical UTA chips may be used with commercially available read only memory (ROM) integrated circuits (ICs) to configure a large family of microcontroller networks. Alternatively, identical UTA chips may be connected externally in a different manner to realize many flip flop, shift register, and universal counter functions often required in timing and control networks.

All UTA functions are realizable using equivalent networks of commercially available integrated circuits. However, more part types and also a greater number of ICs generally are required in these networks. Thus at first level, the UTA specifies the architecture or functional design of a multi-purpose LSI part which can be used to replace many more complex networks of commercial ICs. The architectural design hereinafter described defines the function performed by the counter cells, branch and increment logic, and their input/output signal patterns. The architectural design description also specifies the different functions implementable with one or more UTA chips using various external connections. Count cell and branch and increment logic design are specified at a functional level in FIGS. 2 and 3. FIGS. 18 through 34 illustrate UTA microcontroller design and other UTA applications.

A second level of invention specifies an implementation of the UTA functional design using emitter coupled logic (ECL) circuitry. The circuit and logic diagrams shown in FIGS. 4 through 12 define this implementation. The particular ECL design used improves UTA performance (e.g. increases maximum operating clock frequency), widens UTA operating temperature range, and reduces on-chip circuit complexity. Special circuit design features resulting in these improvements include a multimaster single slave flip flop (MMSSFF) counter cell design, and branch increment logic design that incorporates cascode or series gated ECL circuits. The cascode circuits are special cases of universal logic gate (ULG) circuits. The particular MMSSFF design used in UTA counter cells eliminates all gating in series with important flip flop input signals. Also, the UTA can operate over a full military temperature range because two-level rather than three-level cascode or series gated circuits are used in UTA MMSSFFs. With the particular ULG circuit design incorporated in the branch and increment logic, all combinational functions including the input 4:1 multiplexer are realized in the one gating stage.

The ECL circuit design used in the UTA itself is technology independent. Thus UTA ICs implementing the design might be built with a junction isolated IC fabrication process or alternatively with a dielectrically isolated IC fabrication process. Moreover, for any technology or layout design rules, various current and voltage levels may be selected to determine circuit element power dissipation and delay performance. Further, UTA LSI realization may be achieved using a hand crafted full custom die layout design or a special metalization pattern on a configurable gate array. UTA LSI parts have been built using a commercial production ECL-10K junction isolation fabrication process. Signal levels and power supply voltages using in UTA on-chip circuits were designed to be compatible with signal levels and voltages used in standard ECL-10K logic families. The circuit (e.g. resistor) values shown in FIGS. 4 through 12 pertain to ECL-10K processing and circuit design.

UTA LSI realization was achieved using a reconfigurable 48-cascode cell Universal Digital Array (UDA). UTA LSI implementation using the 48-cell UDA is defined in FIGS. 13–16.

Although specific, a third element of this invention defines UDA cell placement, and the interconnection layouts used to implement the UTA. Because nearly all available UDA on-chip circuit elements are incorporated in the UTA network, only specially selected cell placements and corresponding interconnection routing patterns can achieve UTA realization using available UDA routing space. A wider range of placement and routing designs would be applicable if the die were larger and more interconnect routing space were available. However, increasing die size would reduce manufacturing yield and increase part cost.

DETAILED DESCRIPTION OF THE INVENTION

The following section describes UTA architectural design by defining the functions performed by UTA count cells and branch and increment logic. ECL circuit designs for these elements are then presented under the heading UTA ECL Network Design. Then the LSI implementation of these circuit designs using a Universal Digital Array are described. In conclusion UTA applications in microcontroller configurations and in other timing and control networks are described.

UTA Architectural Design

The UTA is a multipurpose LSI part designed for use in timing and control networks. The functional design and operation of the UTA and its component networks are described further here.

UTA functional design is shown at a block diagram level in FIG. 1. As indicated in FIG. 1, the UTA consists of four functionally identical 2-bit universal counter cells plus a branch and increment logic network. The branch and increment network includes the 4:1 branch condition input multiplexer shown separately in the block diagram.

Each count cell is fed by an equivalent set of control, data and clock input signals. Every count cell generates two Q outputs (e.g. Q11 and Q12 are output by the first cell) and a terminal count (TC) output signal. Parallel entry (PE) and three count enable signals (C11, C12, and C13 at count cell 1) are primary mode controls. The select (S) input to each counter controls parallel data entry multiplexers which select either L1 and L2 or H1 and H2 data inputs. These data are stored in the counter in a parallel entry mode. Additional controls are terminal count inputs (T1 and T2 in the first cell). These effect only count cell terminal count output.

Branch and increment logic network operation is controlled primarily by synchronization (SYNC), branch command (BCMD) substate terminal count (SSTC), and no-hold (NH) inputs. Branch condition inputs BC0 through BC3 are selected by the input multiplexer under control of M and L inputs. Branch and increment logic network outputs are a state count enable signal (SCE) and both complimented and uncomplimented substate parallel entry and state parallel entry signals (SSPE, $\overline{SSPE}$, SPE, and $\overline{SPE}$ respectively).

Unless connected externally the branch and increment network and the four counter cells are all independent and share only common clock input signals. These clock input signals are CK12 and CK34B which are fed respectively to count cells 1 and 2 and to count cells 3 and 4 plus the branch increment (B) logic network. Thus as described in a later applications section, the five UTA sub-networks may be used independently or together in microcontroller networks.

In microcontrollers count cells from one or more chips may be chained together to form longer multistage counters. Branch and increment logic inputs and outputs are connected externally to selected multistage counter inputs and outputs and also to ROM data outputs. Connections required in microcontrollers were used to define particularly branch and increment logic functions and the names of the branch and increment logic I/O signals.

Prototype UTA count cell functional logic design is shown in FIG. 2. The FIG. 2 diagrams define the design and operation of any of the four UTA count cells. However, FIG. 2 logic design does not describe actual count cell network design. ECL network design defining implementation of the functions specified in FIG. 2 is described in the next section.

As shown in FIG. 2, each count cell contains two 1-bit counter elements. Counter control inputs are buffered and complemented through gating shown at the top left of the diagram and fed in parallel to the two 1-bit counters. Additional terminal count control inputs T1 and T2 are buffered and combined by the gate shown at the top right of the diagram. Its output T1+T2 is used with counter complement outputs $\overline{Q1}$ and $\overline{Q2}$ to generate the count cell terminal count (TC) output.

Each UTA counter is functionally equivalent to a master slave flip flop with the control input gating shown in FIG. 2. The control gating generates the $D_M$ data signal input to each flip flop. The flip flops in each 1-bit counter are identical and their input control networks are almost identical. These networks differ only in that the second incorporates an extra control input (at the second AND gate). This input is fed by the Q1 output from the first flip flop to chain the two counters together. This chaining slaves the second counter to the first during count up operation.

Counter cell operation is determined by clocked masterslave sequential operation of the flip flops and by the functions performed by the input control networks. The timing for a single master slave flip flop is shown in FIG. 2b. Initially, assume that a 0 state (Q=0) is stored. Then the D-input signal may change as indicated, for example, from a logic 0 or VOL level to a logic 1 or VOH level, before a positive clock edge. (The D input should be stationary immediately preceding and during the transition for proper flip flop circuit operation.) As the clock transition occurs the slave output Q remains at a logic 0 or a VOL level, while the master stores the new D input value. As the clock rises further, the slave releases. Then the clock's output Q changes from low to high. This process is delayed relative to the clock by the response time of the slave flip flop.

Subsequently, no change in output occurs as the clock falls because the slave latches before the master releases. When the clock rises again another new D-input state is stored in the master flip flop. If this new state differs from the previous state, the Q output will change again as indicated in the figure.

Repetitive or periodic clock signals are used to synchronize many digital networks. With repetitive clock usage, network operation often is defined in terms of a sequence of states keyed to the number of clock cycles, "n", following a designated starting point. Because new data are stored in master slave flip flops immediately after every positive clock edge, a clock cycle is defined naturally as the period from one clocks leading edge to the next. This identification is suggested in FIG. 2. As indicated, cycle n terminates and cycle n+1 starts at the first clock edge. Cycle n+1 continues until the second clock edge which initiates cycle n+2.

This cycle identification system is widely used because it provides a tool for precise representation of sequential network operation. In the case of master slave flip flops, D(k) and Q(k) are used to indicate input and output logic states during the $k^{th}$ clock cycle. Thus given the timing relationships described, master slave operation requires that for clock cycles n and n+1 separated by a positive clock edge, $Q(n+1)=D(n)$; i.e., the output state after the clock edge equals the data input state before the clock edge.

The operation of the two counter circuits is shown in the table of FIG. 2a. Operation of the first counter is controlled by PE, S, and count enable inputs C1, C2, and C3. These are consolidated through input gating to form a master count enable signal $C=C1+C2+C3$. Primary mode control is defined by the state of the parallel entry signal PE. When PE=0, data are entered into the counter cell. In this case, secondary control is provided by the select input S. Thus the select input multiplexers input data so that S=0 and the external data input L1 is fed to the first flip flop. If S=1, the external data input H1 is fed in instead.

After parallel data entry, mode control PE is set to one. Counter operation begins at the next leading clock edge after PE=1. With PE=1 the counter will hold if the count control $\overline{C}=0$ (i.e. if C=1) and count up if $\overline{C}=1$ (i.e., C=0). Complete counter cell control equations are given in the top row of the table of FIG. 2a. These require that $$Q1(n+1)=DM1(n)=PE(\overline{C}\oplus Q1)+\overline{PE}(SH1+\overline{S}L1)$$

and $$Q2(n+1)=DM2(n)=PE(\overline{C}Q1\oplus Q2) +\overline{PE}(SH2+\overline{S}L2).$$

Second counter operation is nearly identical to first counter operation. However, because first counter output Q1 is AND connected with the complement count enable signal $\overline{C}$, the second counter is slaved to first counter in the count up mode. Thus, in this mode, the second counter will toggle at a next clock edge only if first counter output Q1=1 during the clock cycle preceding the clock edge. This ensures that the second counter will toggle only at half the rate of the first. The first counter divides the clock frequency by two and thus the second divides the clock frequency by four. Slaving flip flop 2 to flip flop 1 may be described equivalently by defining count all state output as $Q0(2^0)+Q1(2^1)=Q0+2Q1$. Then counter chaining assures that the state will follow a count up sequence 0, 1, 2, 3, 0, 1, 2, 3, 0, ... in continuous operation.

The control functions specified in the table are equivalent to those performed by input gating networks connected in the manner shown in the logic diagram in FIG. 2. Each control network consists of two elements. In the first counter, the first element is a dual AND feeding EXCLUSIVE-OR gate. This element realizes the control function $PE(\overline{C}\oplus Q1)$ as shown at the EXCLUSIVE-OR gate output. The second element, a dual AND feeding OR gate realizes the input multiplexer function shown at the OR gate output. The input control functions in the second counter are synthesized in a similar manner.

Figure 3A:
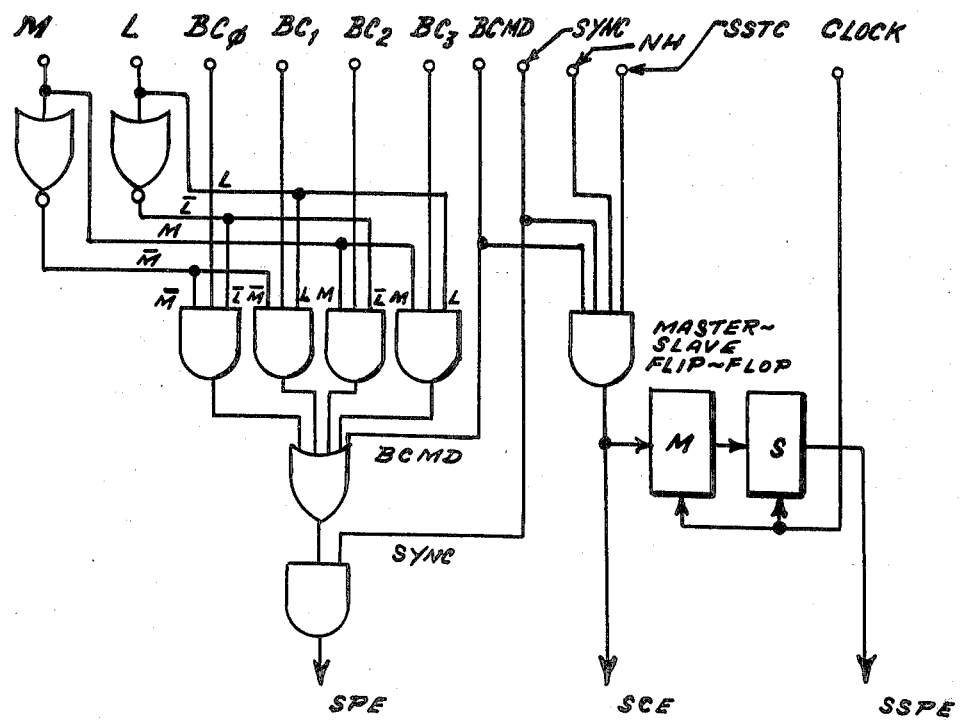
FIG. 3a is a functional logic diagram of the branch and increment logic circuit.
Figure 3B:
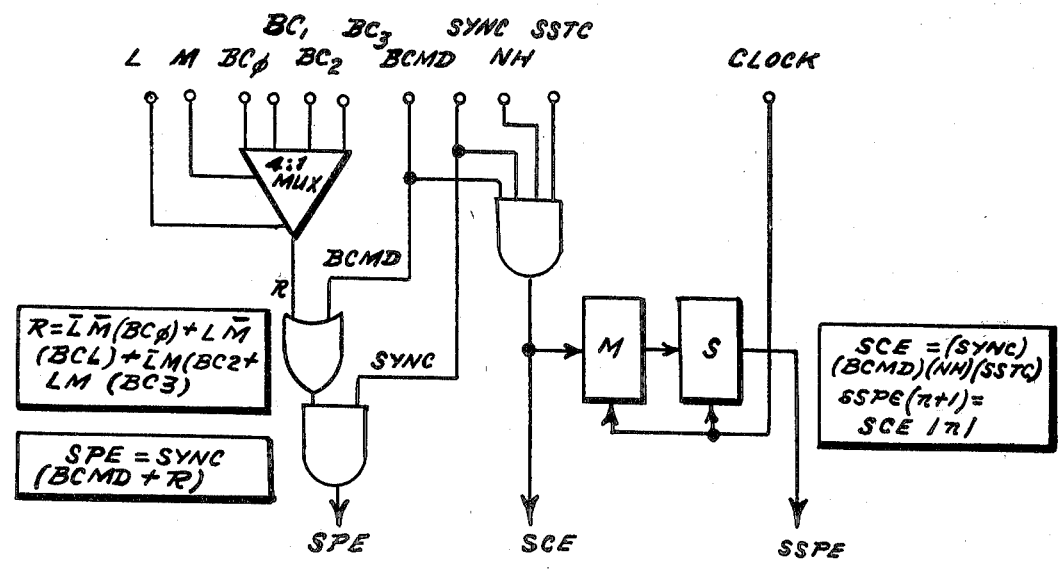

Branch and increment logic design is shown in FIG. 3a and is defined more concisely in the equivalent logic diagram of FIG. 3b. As indicated, outputs SPE and SCE are purely combinational functions of the input signals shown at the top of the diagram. The SPE output function is given by $$SPE=SYNC(BCMD+R).$$

where R is the multiplexed branch condition input signal controlled by control signals M and L;

$$R=\overline{L}\overline{M}(BC0)+L\overline{M}(BC1)+\overline{L}M(BC2)+LM(BC3)$$

The SCE output is the AND of BCMD, SYNC, NH, and SSTC input signals.

The SSPE output is derived from a clocked master-slave flip flop fed by the SCE signal. In a typical application one or more of the signals feeding the SCE AND gate are time-variable and change in succeeding clock cycles. Then with flip flop timing as described previously, the flip flop merely delays a time-variable SCE signal by one clock cycle. Thus $SSPE(n+1)=SCE(n)$ as indictated at the lower right of FIG. 3b.

UTA ECL Network Design

Four ECL network building block circuits are used to implement UTA counter cells and branch and increment logic. The building blocks are master latch, slave latch, cascode logic and current-switch emitter follower (CSEF) gate circuits. This section first describes each of the circuit building blocks and then describes the way that UTA networks are built using them.

The first circuit building block is the master latch circuit shown in FIG. 4. This circuit in itself, possibly with minor variations is similar to many in common usage. It is described here to identify latch features important in UTA networks and also to provide background information.

Master latch circuits contain a lower current-switch differential pair (Q2 and Q4). This pair steers a switch current ISW developed through current source transistor Q1 from either of two upper current-switches. The first or D-upper current-switch is composed of transistors Q5 and multiple transistor Q10. Differential pair Q8 and Q9 comprise the second or feedback upper current-switch. This is connected in a positive feedback configuration through emitter-follower transistors Q11 and Q13.

The clock input signal is level shifted by approximately 1.6 volts through clock input transistors Q7 and diode D1. The level shifted signal is fed to the base of lower current-switch transistor Q2. In standard ECL circuits such as shown in FIG. 4 logic levels VOH≅−0.9 volt and VOL≅−1.7 volts are used for logic 1 and logic 0 levels, respectively. Thus, after level shift translation, the clock signal at the base of Q2 varies between approximately −2.5 and −3.3 volts. The other lower current-switch transistor Q4 is fed by a constant reference voltage VBB2M, approximately −2.9 volts, developed in the bias network shown at the right of FIG. 4. Therefore, when the clock is low, ISW is drawn through Q4 from the D-input upper current-switch. In this case the feedback current-switch is "disabled".

One D-input current-switch transistor, Q5, is fed by another constant reference voltage (VBB1) approximately −1.3 volts. This is developed at the base of Q14 in the bias network. Thus when the clock is low if any of the inputs DM1, DM2, or DM3 are at a logic 1 or VOH level, switch current is drawn through these transistors. Then their collector voltage is pulled down from VCC or ground to −(ISW) (RL)≅−0.8 volt where RL is the load resistor (R14 and R18) value or 200 ohms. If all D-inputs are at a logic 0 or VOL, ISW flows through Q5 and its collector is pulled down to approximately −0.8 volt. In this case the voltage at the Q10, common collector node is high, i.e., at VCC or ground.

The D-input upper current-switch collector nodes are collected in parallel with the collector nodes of the feedback upper current-switch transistors in the manner shown in FIG. 4. Thus when the clock is low D-input switch collector signals are fed continuously to the inputs of the Q8, Q9 feedback pair through emitter-followers Q11 and Q13.

The D-input signal is replicated at the Q5 collector and its complement, D is replicated at the Q10 common collector. Therefore, the D-input signal to the feedback pair is at a logic 1 level if no current is flowing through Q5, i.e., if any one or more of the D-inputs is high. Hence, the parallel transistors Q10 implement an implicit OR gate. Gate output equals logic 1 whenever the logic function DM1+DM2+DM3=1.

As the clock signal rises from low to high, switch current is transferred in the lower current-switch. When the current through Q2 increases (above 0) differential amplifier gain of the feedback upper current-switch pair Q8, Q9 increases from 0 through unity toward a final value (e.g. 5 to 10). When unity gain is exceeded, the feedback pair regenerates. Because the D-input and its complement are fed differentially to the bases of Q8 and Q9 through emitter-followers Q11 and Q13, when regeneration occurs, the feedback pair locks up or latches the D-input state.

UTA master latch circuits are used in two configurations. In the first an ECL logic level clock signal is input to the base of Q7, level shifted through Q7 and D1 as described previously and fed to lower current-switch transistor Q2. This level shifted clock signal (LSCK-OUT) also is output from latch and used by other master and slave latch circuits. In the second configuration the Q7-D1 level shift circuit is not used. Instead a level shifted clock input signal is derived in another master or slave latch and fed directly to the lower current-switch input at the base of Q2.

Logic diagrams representing the two master latch circuit configurations are shown at the top of FIG. 4. Note that in both cases only the complement signal $\overline{QM}$ is output. This is consistent with all master flip flop usage except in the branch and increment logic network. There uncomplemented output QM is generated at node E3 and used instead.

Hereinafter, in the following description and claims the expression "master latch circuit" will be taken to define substantially the circuit above described.

ECL slave latch design is nearly identical to master latch circuit design. UTA slave latch design is shown in FIG. 5. As in the case of master latch circuit design, the basic slave latch circuit design used in the UTA is similar to many in common use. Therefore, slave latch operation is described here to identify features used in the UTA and to provide background operation. The slave circuit differs from the master circuit mainly in that the reference voltage VBB2S fed to the lower current-switch (Q4 in FIG. 5) is approximately 100 mV higher than the reference voltage fed to the lower current-switch in master latch circuits. An additional change is that the clock is fed to one side of the lower current-switch in master circuits but to the opposite side in slave circuits. Thus, when the clock is low switch current flows through Q4 in the slave and then to the regenerative differential switch Q10 and Q9. When the clock is high the current flows instead through Q2 to the input differential pair Q8 and Q5. In the slave latch feedback is provided through emitter-followers Q11 and Q13. In master latch circuits the D-input differential pair is active when the clock is low. Because the clock input is reversed in slave latch circuits, just the opposite is true. Thus, the input differential pair Q5, Q8 shown in FIG. 5 is active when the clock is high. Then differential pair Q8, Q5 follows a $D_S$ input signal derived from a master latch circuit. In this case, the master latch output is fed through the slave to its outputs QS and $\overline{QS}$. When the clock falls from high to low the active differential data input pair is disabled and the regenerative pair is turned on. At this point, regeneration occurs and the slave latches its data input.

As in the case of master latch circuits, two slave latch configurations are used in the UTA. Standard ECL clock signals are input in the first configuration. Level shifted clock signals are generated, used internally and output for other latch circuits. In the second configuration level shifted clock input signals are used. Logic diagrams for the two configurations are shown at the upper left of FIG. 5.

In the UTA slave latch output signals are derived at emitter nodes E2 and E3 shown in FIG. 5. These signals are at standard ECL signal levels. In addition, collector signals at the L2 and L3 nodes are output. These signals are fed to the bases of large output emitter-follower transistors used to develop off-chip output signals. Emitter output signals are designated by the letter "E" in slave latch logic diagram. Collector outputs are designated by the letter "C" in a similar manner.

When master latch circuits are connected to slave latch circuits, master slave operation takes place at clock transitions. Proper circuit timing relationships are established because of the offset between the lower current-switch reference voltages used in the master and slave circuits. As noted previously, the slave lower current-switch reference voltage is approximately 100 mV higher than master latch lower current-switch reference voltage. At a positive going clock edge the clock rises toward the master lower current-switch reference voltage first. At this point the master latches to its data input. Then as the clock rises further toward the higher slave lower reference voltage, switch current is transferred from the slave feedback to the slave input pair.

Then the slave input pair passes data now latched in the master to the slave outputs. At this point the slave outputs will change state if the new data stored in the master are different from data stored previously in the slave. The sequence master acquire, then slave release ensures that the output will change only if the new data stored in the master differ from data stored previously in the slave.

As the clock falls it reaches the higher slave lower current-switch reference voltage level first. Then the slave first latches to acquire the master output. As the clock falls further toward the master lower current-switch reference voltage, the master releases, acquires and tracks its new input data. The sequence slave-latch, then master release ensures the data stored in the master will be captured in the slave before the slave is released to acquire new data. These master-slave sequential timing relationships were shown in the timing diagram in FIG. 2b.

Hereinafter, in the following description and claims the expression "slave latch circuit" will be taken to define substantially the circuit above described.

Figure 6:
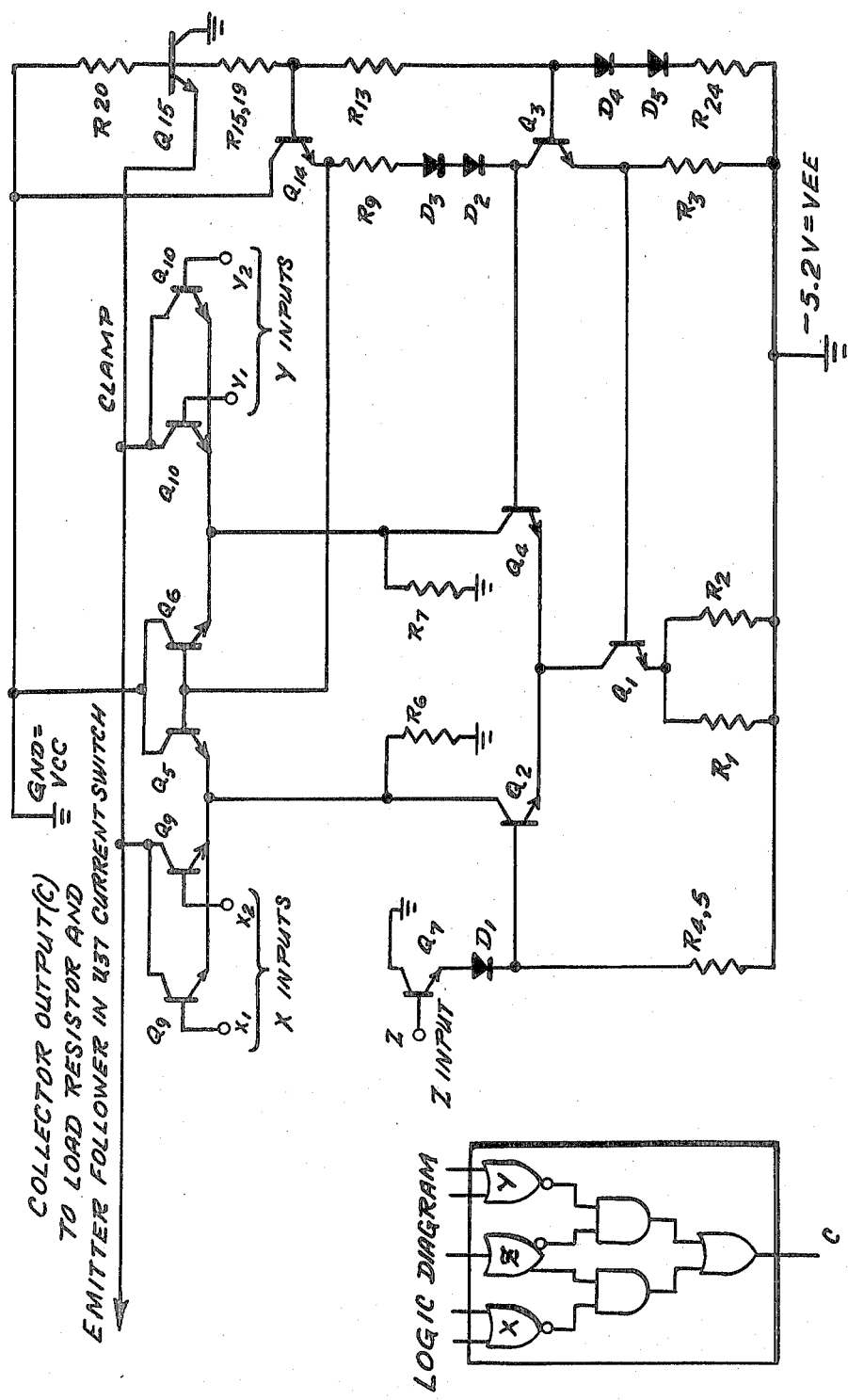
FIG. 6 is a schematic diagram of the cascode logic circuit utilized in the UTA.

The third UTA building block is a cascode logic circuit shown in FIG. 6. The circuit develops switch current ISW through current source transistor Q1. ISW is steered through the lower current-switch Q2, Q3 and then either through the X-input current upper switch Q9, Q5 or through Y input upper current-switch Q6, Q10. The cascode circuit includes a bias network Q14, R9, D3, D2, Q3, R3 with Q15, R15, R19, R13, D4, D5 and R24. This network develops a clamp voltage at the emitter of Q15 and three reference voltages. The first reference voltage (approximately −1.3 volts) is fed to the upper current-switch at the bases of Q5 and Q6. The second, approximately −2.9 volts, is fed to the lower current-switch at the base of Q4 and the third, approximately −3.8 volts, is fed to the base of the Q1 current source transistor.

The cascode Z-input signal is level shifted by approximately 1.6 volts through Q7 and D1 which are fed through the base of Q2. Thus, when Z=1, i.e., Z is VOH (approximately −0.9 volt), the voltage at the base of Q2∼0.4 volt above the lower current-switch reference voltage. In this case, switch current flows through Q2 and the X-input upper current-switch. When Z=0, ISW flows through Q4 from the Y-input upper current switch. Thus, if Z=1, switch current flows through Q9 if either X-input is high, i.e., if X1+X2=1. If Z=1, but X1+X2=0, then ISW flows through Q5. Similarly, if Z=0, switch current flows through Q10 if Y1=Y2=1, and otherwise ISW flows through Q6.

In the cascode building block network the collectors of Q9 and Q10 are WIRE-AND connected. The current from the Q9–Q10 common collector node is drawn through an external load resistor tied to ground to generate an output voltage signal. The output voltage is low when switch current is drawn from Q9 to Q10; otherwise it is high. Thus, the output is high when ISW flows through Q5 or Q6 and not through Q9 or Q10. Logic equations defining switch current flow through Q5 or Q6 may be written directly from an analysis of current flow through the circuit. Current flows through Q6 if Z=1 and X1+X2=0; current flows through Q5 if Z=0 and Y1+Y2=0. Combining these expressions yields the logic equation for current flowing through Q5 or Q6, or equivalently no current flowing through Q9 or Q10 and hence a high output voltage. This equation is given by $$f=(\overline{X1+X2})Z+Z(\overline{Y1+Y2})$$

The logic diagram shown at the left of FIG. 6 implements this logic equation.

As indicated previously, the cascode output voltage is developed across an external load resistor. In the UTA, the load resistor is incorporated in a separate current-switch circuit. The cascode cell collector is tied to the collector node of the current-switch to form a second WIRE-AND connection. With the current-switch and cascode WIRE-AND connected in this manner, one switch current from the cascode and a second from a current-switch may be drawn simultaneously from the common collector node through the load resistor. If both switch currents are drawn simultaneously, the voltage at the collector node could fall below the level required for proper circuit operation and upper current-switch transistors would saturate. The clamp transistor Q15 in the cascode cell is connected to this common collector node to prevent this from occurring. The transistor conducts when the collector falls below approximately 1 volt but otherwise does not affect the circuit operation.

Hereinafter in the following description and claims, the expression "cascode logic circuit" will be taken to define substantially the circuit above described.

The last UTA circuit building block is a standard ECL CSEF OR/NOR gate. In the CSEF circuit shown in FIG. 7a, the switch current is drawn through one or more input transistors if one of the input signals is high. In this case, switch current flows through the load resistor at the input transistor common collector node and not through the other load resistor. Thus, if any of the inputs is high, the NOR output is low and the OR output is high. Otherwise, with all inputs low, the NOR output is high and the OR is low. This logical operation is specified by the CSEF NOR/OR gate logic symbol at the right of FIG. 7a.

In the UTA all ECL building block circuits internal emitter-follower outputs are connected through pulldown resistors to VEE. These resistors provide bias current to discharge interconnect and other parasitic capacitance at emitter-follower output nodes during negative-going signal transients. In UTA logic diagrams a "boxed T" is used to designate a pulldown resistor connection to an OR/NOR gate emitter-follower output node in a manner shown in FIG. 7a. In UTA logic diagrams defining larger networks containing several ECL circuits, the "T" symbol is shown adjacent to the logic symbol for the CSEF cell in which the pulldown resistor is located physically.

CSEF gates are WIRE-OR connected in UTA logic networks in a manner suggested in the logic diagram at the bottom of FIG. 7a. In this case, emitter-follower output nodes are tied together and a single pulldown resistor is connected to the common output node.

Output pulldown resistors are used identically in all latch circuits described previously. Therefore, internal pulldown resistors were shown in latch circuit diagrams, but their usage was not distinguished by special symbols in the corresponding logic diagrams. However, when slave latch $\overline{QM}$ outputs are WIRE-OR connected as described further below an external pulldown resistor is connected to the WIRE-OR output node. This external pulldown resistor usage is also designated by a "boxed T" symbol in the same manner as with current-switch circuits.

Current-switch gates also are WIRE-AND connected in the UTA in the manner suggested in FIG. 7b. In this case, the collector signal from the second gate is fed into the first gate and tied to a collector node there. Output voltage is developed across the load resistor and translated through an emitter output follower in the first gate. This configuration is depicted using logic diagrams in the manner shown in FIG. 7b. A "C" designation is used at all gate collector output nodes used in a WIRE-AND connection except at the collector node of the gate in which load resistor is located. The "boxed" pulldown termination symbol is used at the corresponding emitter-follower output in the same manner as described previously.

Hereinafter, in the following description and claims, the expression "current switch emitter-follower circuit" shall be taken to define substantially the circuit as above defined.

The four building block circuits are used to implement the UTA count cells and the branch and increment logic networks defined previously at a functional level in FIGS. 2 and 3, respectively. Master and slave latches and CSEF gates are used in count cell networks. The FIG. 8 Count Cell-1 logic diagram defines their interconnection and also count cell-1 LSI implementation using the UDA. UTA LSI implementation is suggested by boxes at input and output signals indicating their connection to LSI chip bonding pads. Also, all elements are numbered (e.g., CS11, U24, U48) to indicate their locations on the UDA die. The symbols X at the U24 gate input and A and B at U24 outputs define the LSI cell internal connections required to realize the gate function. UTA LSI implementation is described in more detail in the next section. UTA logic design specifying building block circuit utilization to implement count cell and branch increment functional design is described further here.

Figure 8:
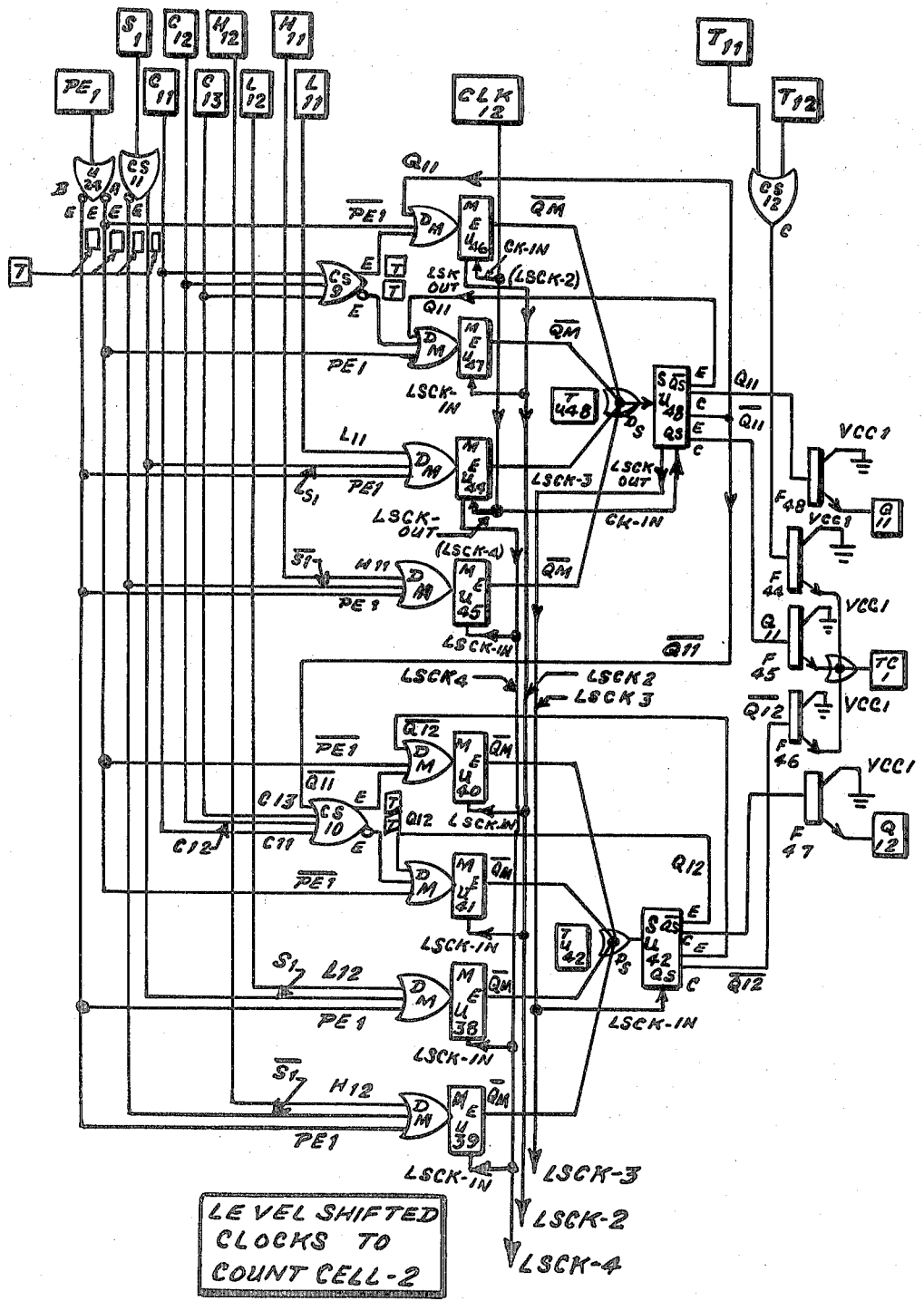
FIG. 8 is a logic diagram of count cell 1 of the UTA.

The Count Cell-1 network consists of two 1-bit counters, input buffer gates, and large output emitter-follower transistors F44 through F48 shown at the right of the diagram. The first 1-bit counter is made up of the four master (M) and single slave (S) latches U44 through U48. The second counter is made up of latches U38 through U42. As indicated in FIG. 8, input signals are buffered through gates U24, CS11, CS12, CS9, and also CS10. Input buffer gating functions are analogous to those defined in FIG. 2. Current-switch CS10 also implements the AND-GATE function chaining the 1-bit counters together for the purpose described in the previous description of (FIG. 2) count cell operation.

Count cell-1 logic design differs from the design suggested in FIG. 2 mainly in three respects: (1) a 4-master single-slave counter design is used, (2) a multi-bus clock distribution system is used, and (3) a WIRE-OR connection is used. (The WIRE-ON connection at the emitters of the transistors F44 through F46 is used to generate the count cell terminal count output signal.)

Four-master single-slave operation may be described in the following manner in connection with the first counter (U44–U48) shown in FIG. 8. Control and data signals are input directly to the implicit OR-GATES formed by a master latch multiple D-input transistors. Master latch complemented oututs, QM are WIRE-OR connected and fed to the slave input DS. Then the slave complemented output $\overline{QS}$ is used to generate the uncomplemented counter output $\overline{Q11}$ and uncomplemented slave output QS generates the complemented power output Q11.

With inputs connected to the master latches as shown in FIG. 8, logical input expressions for master data inputs are $DM1 = \overline{Q11} + \overline{PE1} + C$, at U46

$DM2 = Q11 + PE1 + \overline{C}$, at U47

$DM3 = L11 + \overline{S1} + PE1$, at U44, and $DM4 = H11 + S1 + PE1$, at U45, where $C = C11 + C12 + C13$ The complements of these signals are WIRE-OR connected to form the slave DS input; thus $DS = \overline{DM1} + \overline{DM2} + \overline{DM3} + \overline{DM4}$ The slave complemented output QS is used to generate Q11 and the slave uncomplemented output QS generates Q11. Thus $Q11(n+1) = DS(n) = \overline{\overline{DM1}(n) + \overline{DM2}(n) + \overline{DM3}(n) + \overline{DM4}(n)}$ With the equations for DM1 through DM4 used in this expression, after simplification it becomes $Q11(n+1) = PE(\overline{C} \oplus Q1) + \overline{PE}(SH1 + \overline{S}L1)$ This is exactly the control function specified in FIG. 2. Thus, the counter design specified in FIG. 2 is logically identical with the 4-master single-slave network design shown in FIG. 8.

A 4-master single-slave counter configuration is used in UTA count cells because all control (except count enable) and data input gating functions are implemented implicitly in master and slave latch circuits. Thus, no input control or data gating delay is introduced, and performance of the counter is set by the delay normally introduced in the flip flops alone. Using this configuration improves UTA count cell performance appreciably. In alternative designs used in commercially available counters, at least one input gating stage is required in series with control or data inputs.

A second advantage in 4-master single-slave flip-flop configuration is a wider operating temperature range than obtainable with functionally equivalent counter circuits used in many commercially available ICs. In many commercial ICs 3-level cascode latch circuits are used because they perform some of the control and input gating functions and therefore reduce delay and improve counter performance. However, frequently three level cascode circuits do not operate well at low temperatures unless power supply voltages are abnormally controlled. To prevent this 3-level cascode circuits are not used in the UTA. Instead, the 2-level cascode latch circuits described previously are used. These circuits operate well over the full military temperature range and, as indicated above, in 4-master single slave flip flop configurations all counter input gating delay is eliminated.

A multi-bus clock distribution system is used in the UTA. In this system an external clock input is fed to three latches. These latches level translate the clock signal, use the translated clock signal internally, and also output the level shifted clock signal for use in other latch flip flops. This distribution is used for two reasons: (1) loading on the two external UTA clock inputs is limited to three circuit inputs, and (2) power dissipation in clock level shift circuitry is eliminated in all latches fed by level shifted clock inputs as described previously in connection with FIGS. 4 and 5. Logic diagrams shown in FIGS. 4 and 5 are used in FIG. 8 to define clock distribution in count cell one.

As shown in FIG. 8, external clock CK12 is fed through master latch circuits U46 and U47 and slave latch U48. These translate CK12, and generate output level shifted clock signals LSCK2, LSCK3, LSCK4 in the manner shown. These level shifted clock signals are fed to all other count cell-1 latches and also to all latches in count cell-2.

Figure 9:
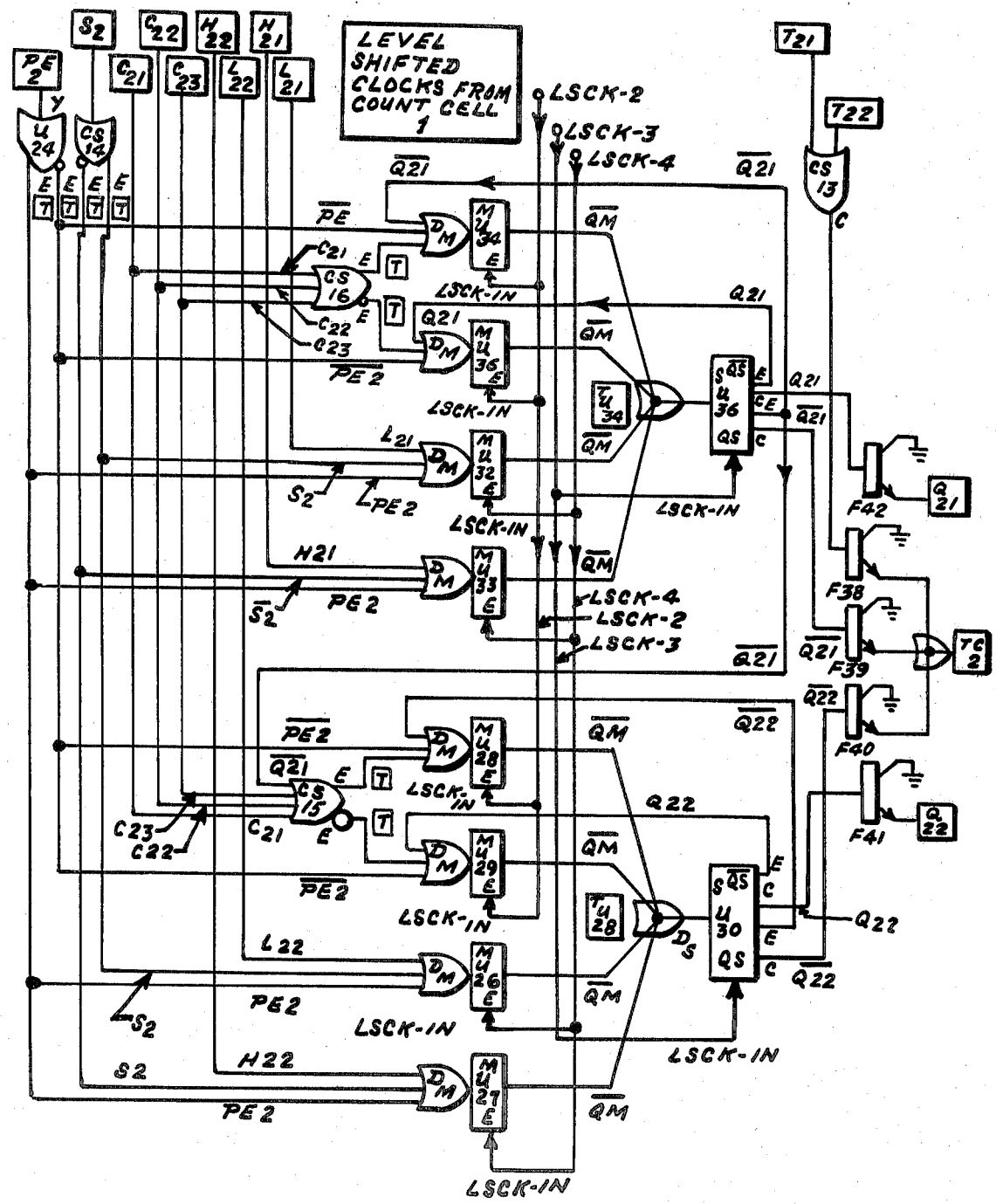
FIG. 9 is a logic diagram of count cell 2 of the UTA.

Count cell-2 logic design as shown in FIG. 9 is essentially identical with the design implemented in count cell-1. Different UDA LSI circuit elements are used in count cell-2. However, aside from this, only the clock signal distribution network in count cell-2 differs from its counterpart in count cell-1. As indicated previously, level shifted clock signals LSCK3, LSCK 4, LSCK5 are derived in count cell-1 latch circuits. These are input to count cell-2 latch circuits in the manner shown in FIG. 9.

Figure 10:
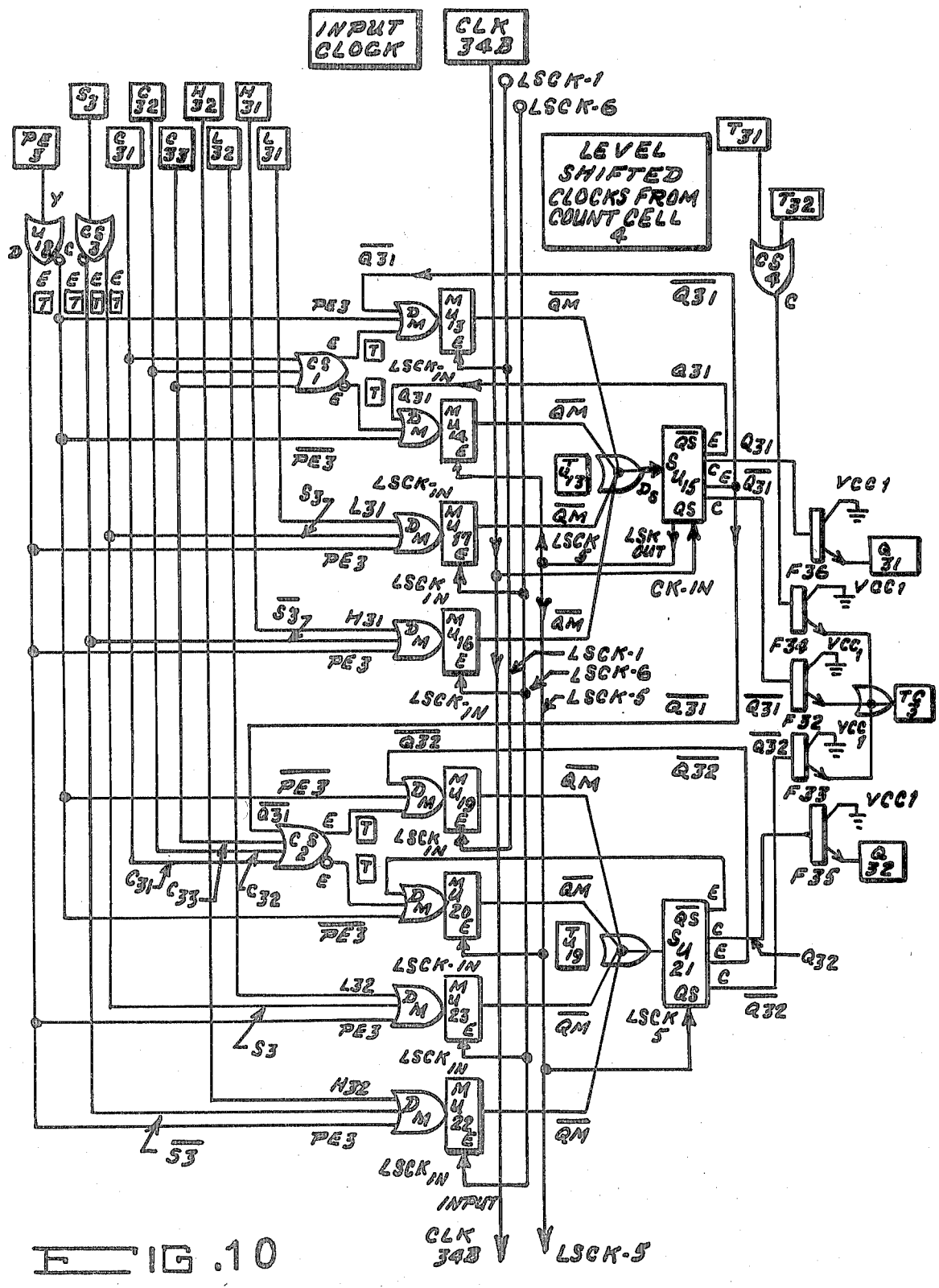
FIG. 10 is a logic diagram of count cell 3 of the UTA.
Figure 11:
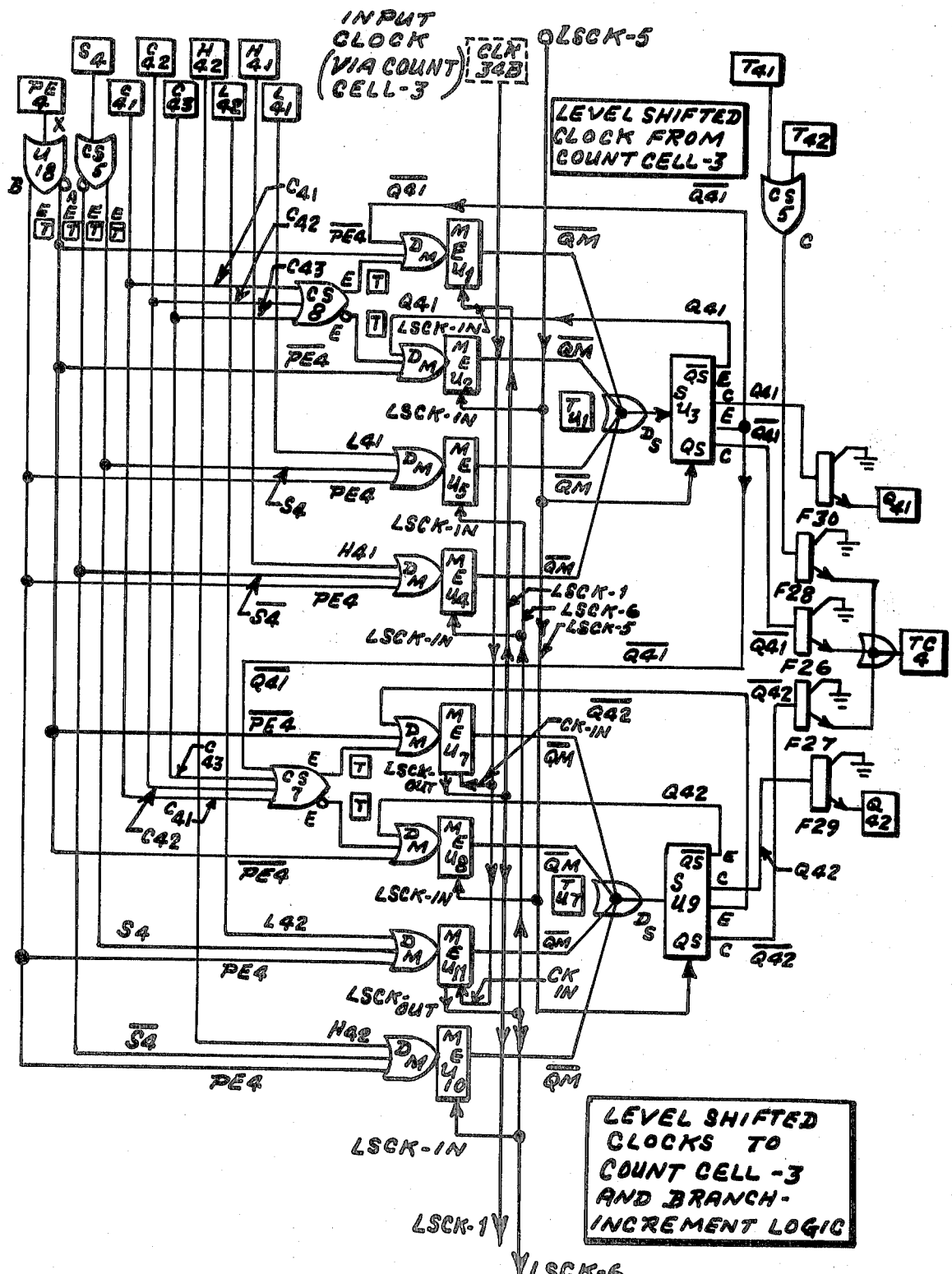
FIG. 11 is a logic diagram of count cell 4 of the UTA.

Count cell-3 and count cell-4 logic diagrams are presented respectively in FIGS. 10 and 11. The logic designs of these cells also are similar to count cell-1 logic design. Again aside from their implementation with different UDA LSI circuit elements only clock signal distribution differs. The second UTA external clock CK34B is input to latch U15 in count cell-3 and latches U7 and U11 in count cell-4. These latches generate level shifted clock signals LSCK1, LSCK5, LSCK6 which are distributed to the other latches in count cells 3 and 4. In addition, LSCK1 is fed to the master slave flip flop in the branch and increment logic network. Rather than generating all level shifted clock signals in count cell-3 and distributing them to count cell-4 in a manner analogous to the distribution system used in count cells -1 and -2, clock translation is shared by latches in count cell-3 and -4 as indicated previously. This particular distribution system reduces the length of clock signal routing and the corresponding parasitic capacitance in the UTA LSI die.

Figure 12:
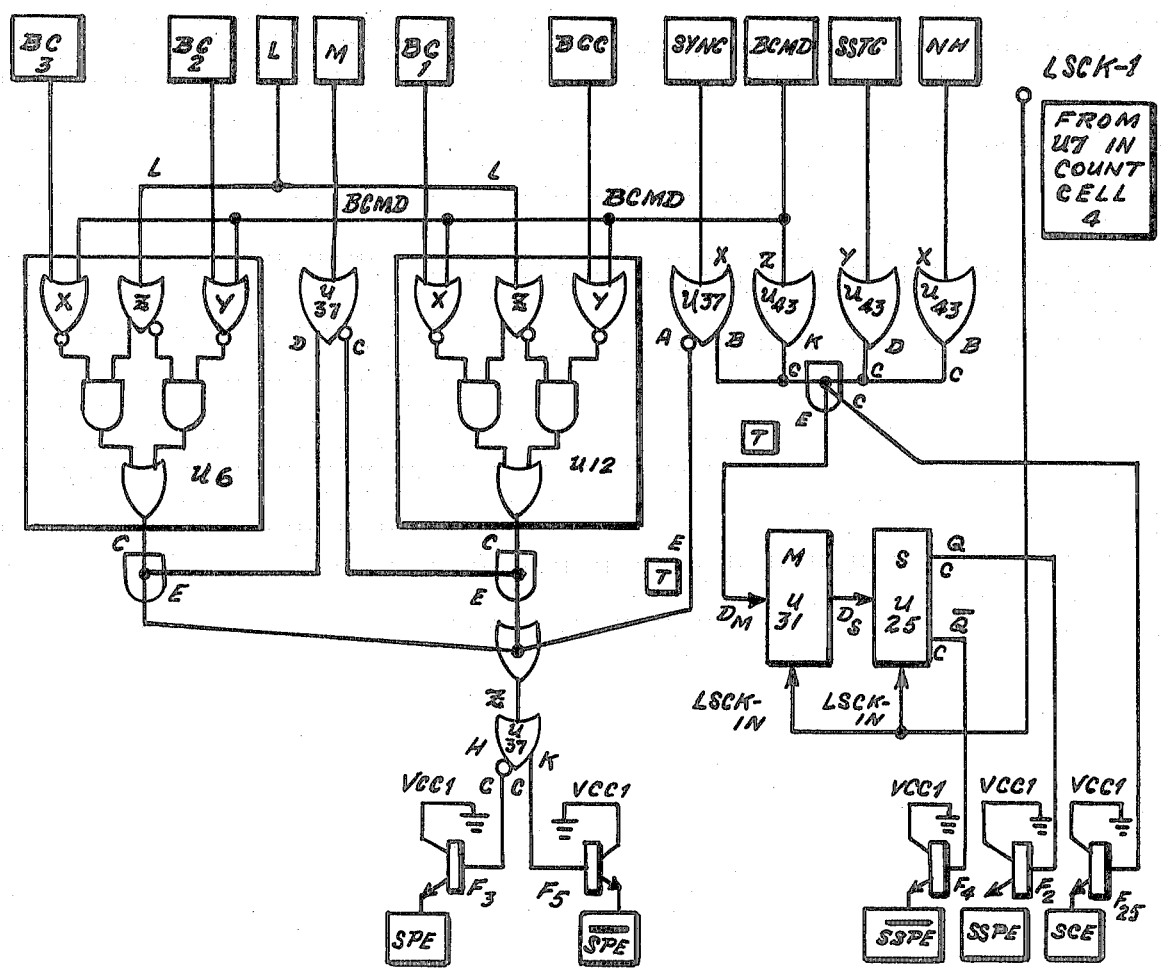
FIG. 12 is a logic diagram of the branch and increment logic circuit of the UTA.

Branch and increment logic design is shown in FIG. 12. The circuit is implemented using two cascode logic cells (FIG. 6), U6 and U12, plus six current switches and master-slave flip flop, U31 and U25. Output signals are derived using large output emitter-follower transistors F2 through F5 and F25.

Cascode circuits U6 and U12 are WIRE-AND connected with collectors of the U37 Y-input gate. Internal emitter-followers in U37 generate voltage signals which are WIRE-OR connected with the A output of the U37 X-input gate to form the function $\overline{SPE}$. $\overline{SPE}$ synthesis is accomplished in the following manner. One function is generated at the collector of U6 after WIRE-AND connection with the U37 D-output. This function is given by $$f_6 = \overline{BCMD}[L(\overline{BC3}) + \overline{L}(\overline{BC2})]M$$

A second function is generated at the collector of U12 after WIRE-AND connection with the C-output collector of the U37; this is given by $$f_{12} = \overline{BCMD}[L(\overline{BC1}) + \overline{L}(\overline{BC0})]\overline{M}$$

Then the output function is formed in the WIRE-OR connection of $f_6$ and $f_{12}$ with the U37A-output. This function is given by $$\overline{SPE} = \overline{SYNC} + f_6 + f_{12}$$

or equivalently $$SPE = SYNC\,(\overline{f_6})(\overline{f_{12}}).$$

After complementation and simplification this expression becomes $$SPE = SYNC\,(BCMD + R)$$

with $$R = \overline{LM}(\overline{BC0}) + L\overline{M}(\overline{BC1}) + \overline{L}M(BC2) + LM(BC3)$$

which is the same function as defined in FIG. 3.

In spite of their complex equivalent logic diagrams cascode circuits U6 and U12 are one gating stage elements as are U37 CSEFs. Thus, the branch and increment logic function $\overline{SPE}$ is generated at the WIRE-OR node in a single gating state or approximately 3 ns in the UTA fabrication with ECL-10K technology. The SPE signal is buffered, inverted, and output at gate U37 and connected to emitter-follower transistors F3 and F5.

The SCE function is also implemented in one stage. This is accomplished in a straightforward manner through WIRE-AND connection of gate outputs as shown at the top right of FIG. 12. The U37 and U43 gates are required to buffer the input signals. The $\overline{SCE}$ output collector signal is fed to output emitter-follower transistor F25. The collector signal also is translated in an emitter-follower internal to U37 to generate the input signal to D flip flop.

SSPE dual outputs are generated using the U31, U25 master slave D flip flop. As indicated previously in connection with FIG. 4, the uncomplemented master output signal QM is fed to the slave input DS to achieve conventional master slave flip flop operation. Slave collector outputs Q and $\overline{Q}$ are fed to output emitter-followers F2 and F4 to generate off-chip output signals SSPE and $\overline{SSPE}$.

UTA LSI IMPLEMENTATION

The UTA was built using a specific metal pattern on an LSI Universal Digital Array (UDA). The UDA incorporates 48 Universal Digital Cells (UDCs) plus 16 peripheral CSEF circuits. Specific intracell metal patterns may be used to configure UDCs alternatively as latch circuits, or as cascode logic circuits, or again, alternatively, as triple current switch circuits. Additional discretionary connections may be used with each basic configuration to further refine cell function. With the appropriate set of intracell connections, selected UDCs were configured to implement exactly the master latch circuits shown in FIG. 4 and the slave latch circuits shown in FIG. 5. The cells configured as master and slave latches are those identified by number with "M" and "S" designations in FIGS. 8 through 11. Alternate intracell connections were used to configure cells U6 and U12 as the cascode logic circuits shown in FIG. 6.

UTA current-switch functions are performed using UDA peripheral current-switch circuits and also universal digital cells U18, U24, U37, and U43 in current-switch configuration. As in the case of UDCs, UDA peripheral current-switches may be reconfigured and interconnected differently using several discretionary metal patterns. Specific discretionary connections were used in the UTA to configure peripheral current-switches in the manner shown in FIG. 13. As indicated, a block of four current-switch elements are used together to implement gates CS1, CS2, CS3 and CS4, respectively with 3, 4, 1 and 2 inputs. Dual internal emitter-follower outputs are generated by the first three gates and pulled down to VEE with pulldown resistors internal to the quad current-switch cell. A collector output is developed by the fourth gate CS4. Accordingly, termination (T), emitter-follower (E), and collector (C) outputs are indicated in the logic diagrams shown at the bottom of FIG. 13.

Four quad current-switch peripheral gating blocks are available in the UDA and used in the UTA Gates in first block are shown in explicity in FIG. 13. Equivalent current switches in the other three blocks are identified in the diagram at the lower left of FIG. 13. This shows, for example, that gates 5 through 8 comprise the second quad current-switch block. The diagram also shows that current switches 1 and 8 are equivalent i.e., CS1 and CS8 are both three-input gates which develop dual internal emitter-follower outputs terminated inside quad current-switch cells. As shown previously in logic diagrams in FIGS. 8 through 11, peripheral current switches are used exclusively in counter cells.

Figure 14A:
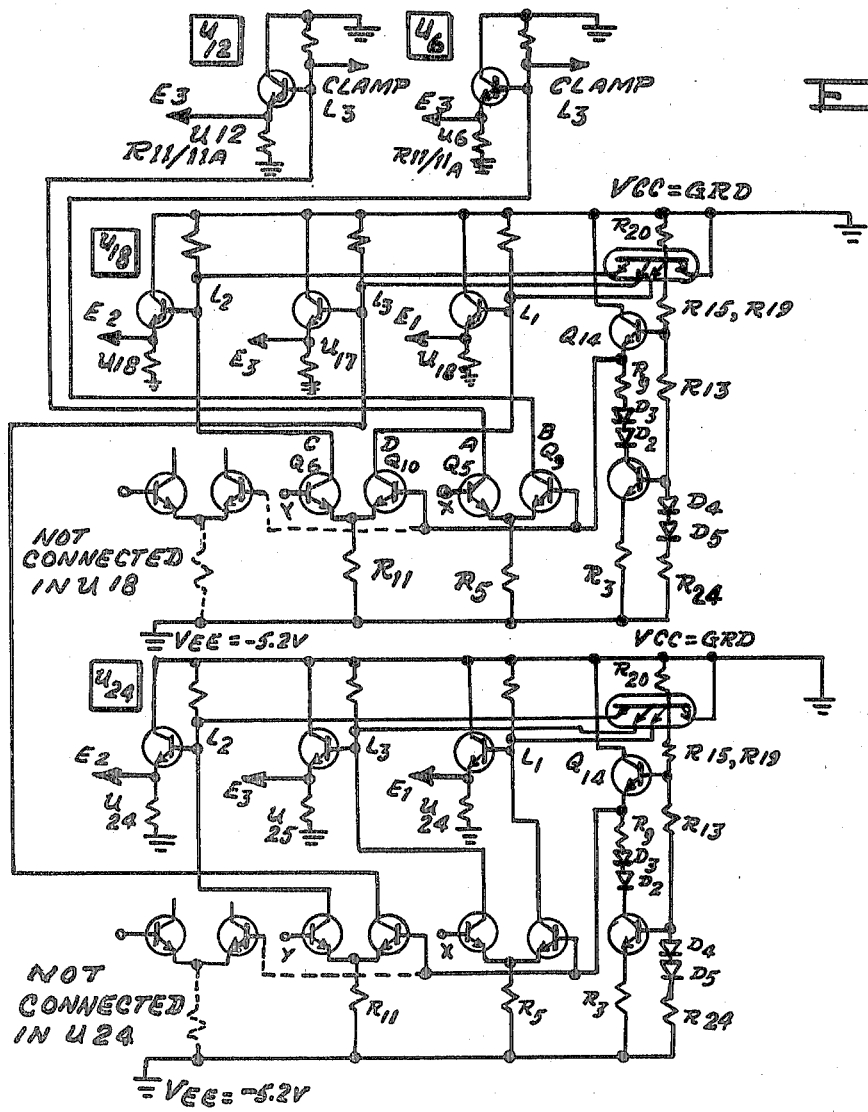
FIG. 14, consisting of a and b, illustrates schematically the current-switch circuit and logic diagrams for two UDA cells.
Figure 14B:
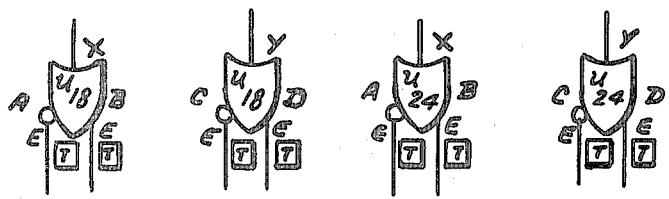

Four additional current-switches are used in counter cells. These are implemented by universal digital cells U18 and U24 which are configured as triple switch circuits as shown in FIG. 14. The three current-switch components in a UDC are distinguished by their input and collector node designations. For an X-input switch, NOR and OR output functions are developed, respectively, at A and B collector nodes. Y- and Z-input current-switches develop NOR and OR outputs, respectively, at C and D and H and K nodes.

Two of the three current-switch elements in the UDCs identified in FIG. 14 are connected in the UTA. The third is not used. Each UDC includes three load resistor and emitter-follower circuits. Inputs to these circuts are designed with an L symbol outputs are designed with an E symbol as is suggested in FIG. 14. With only three load resistors and emitter-follower subcircuits available in each UDC, configuring two dual output CSEF gates per UDC requires additional emitter-follower circuitry. Accordingly, internal emitter-follower circuitry available in U12 and U6 cells is used to obtain additional outputs in the manner shown in FIG. 14. (Only collector outputs were developed in the U6 and U12 cascode circuits making the emitter-follower circuitry in these cells available for other use.)

Figure 15A:
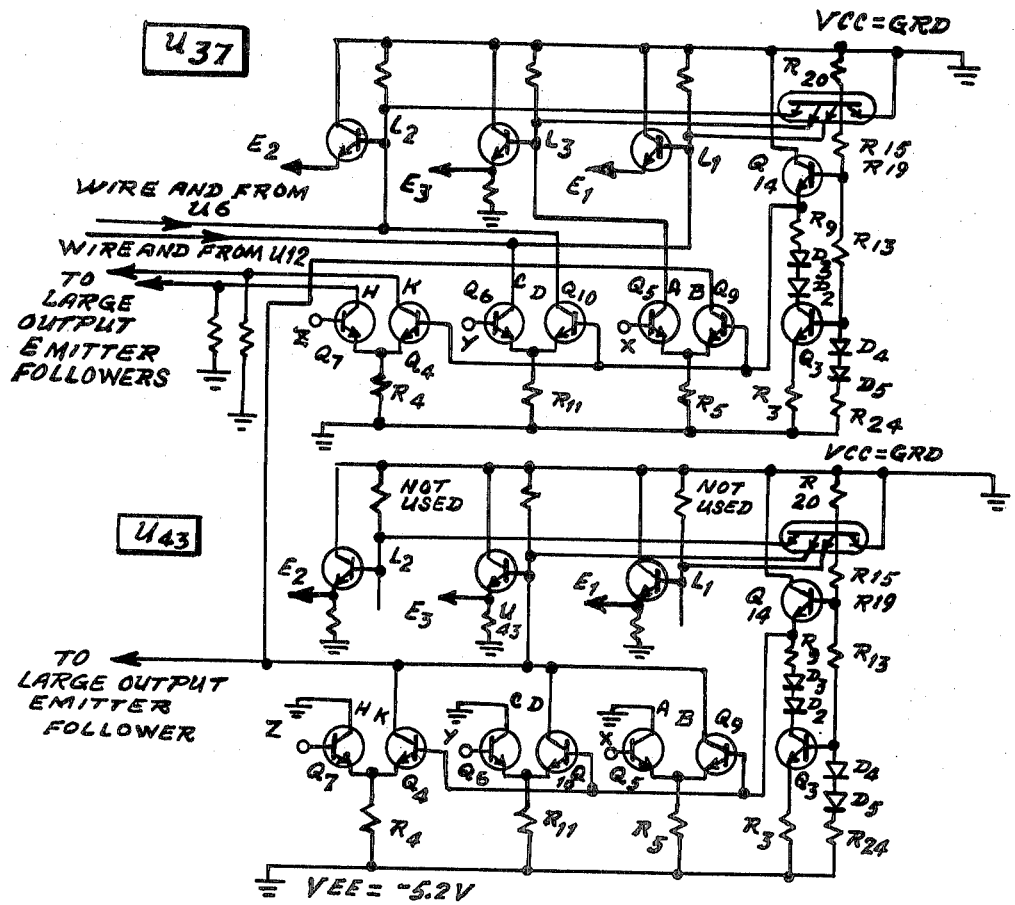
FIG. 15, consisting of a and b, illustrates schematically the current-switch circuit and logic diagrams for two other UDA cells.
Figure 15B:
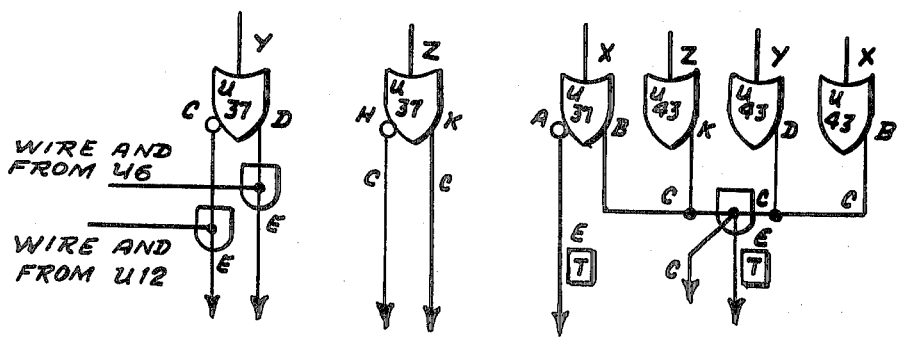

An additional six UTA current-switch elements are implemented using UDCs U37 and U43 as shown in FIG. 15. These are incorporated in the branch and increment logic.

Figure 16:
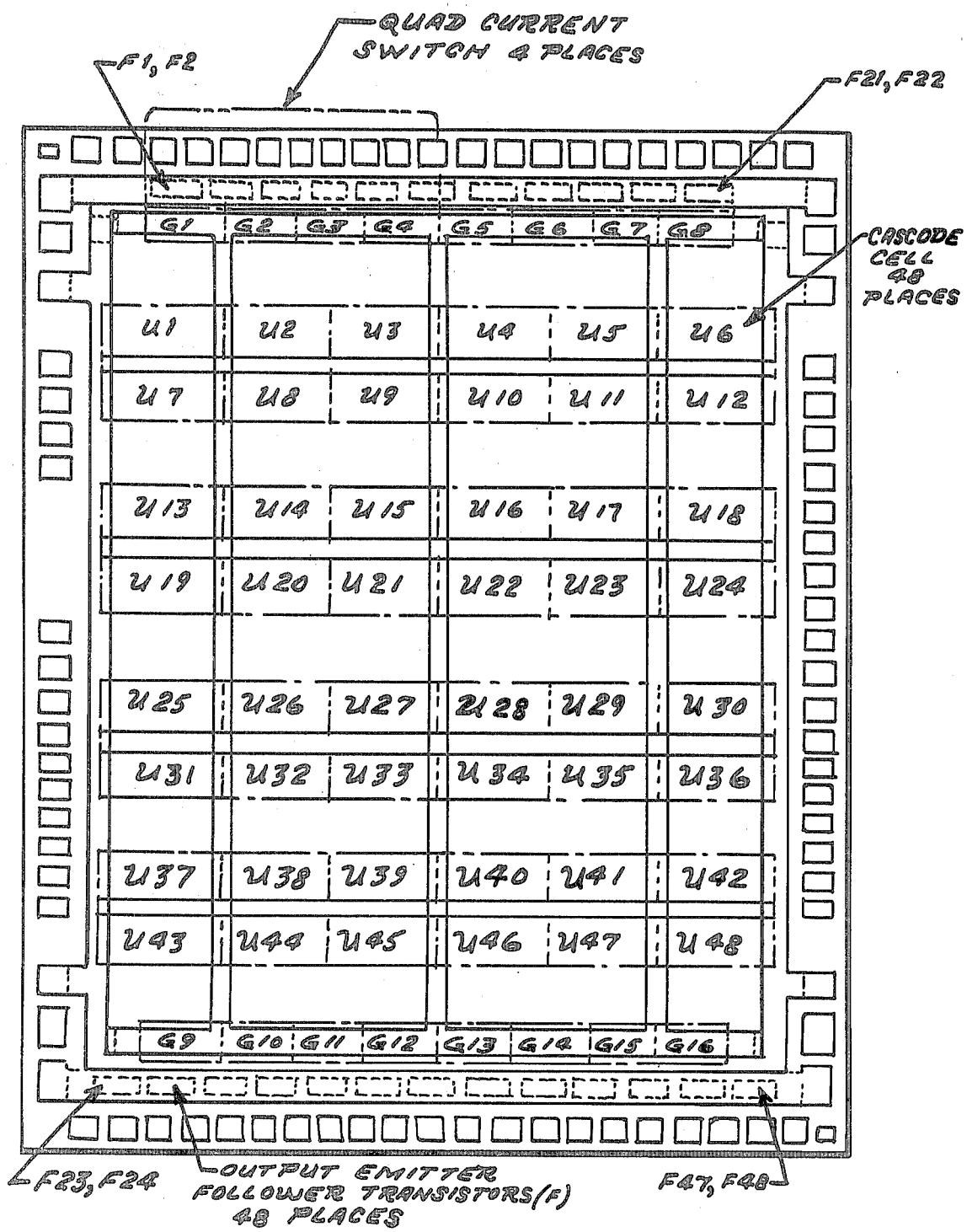
FIG. 16 is a layout diagram of the UDA used in the UTA.

The UDC, peripheral current-switch, and output emitter-follower locations on the UDA die are shown in the layout diagram presented in FIG. 16. UTA signal to pad assignments are indicated as well. (Signal names are shown at each pad location.) As shown in FIG. 16, output emitter-follower transistors F1 through F22 and peripheral current switches G1 through G8 are located at the top of the UDA die. Additional output emitter-follower transistors F23 through F48 and peripheral current-switches G9 through G18 are located along the bottom. Universal digital cells are numbered in a left to right sequence across each row in the central die section.

An UDA on-chip routing layout was developed for interconnecting UTA circuit elements in accordance with the UDC and peripheral current-switch assignments shown in FIG. 16. This routing design was merged with UDA peripheral current-switch and UDC intracell metal patterns necessary to configure UTA latch, cascode, and current-switch circuits. The composite metal patterns were incorporated in UDA metal and via masks which were used to fabricate UTA LSI circuits.

UTA APPLICATIONS

The UTA is designed specifically for building digital timing and control networks. In some timing and control networks the UTA may be used in a microcontroller configurations of varying complexity. In other networks, UTA component count cell and branch increment logic elements may be used differently. The component cells may be used independently to implement flip flops and small logic circuits or together to implement counters, registers, and similar units. This section first discusses UTA operation from an applications rather than internal design standpoint. In the introductory discussion UTA equivalent logic symbols are designated and count cell chaining and multi-stage counter operation are illustrated. Next, UTA microcontroller network design is described. UTA implementations of flip flops and other SSI/MSI functions plus general counter and register structures are discussed at the conclusion of this section.

Figure 17A:
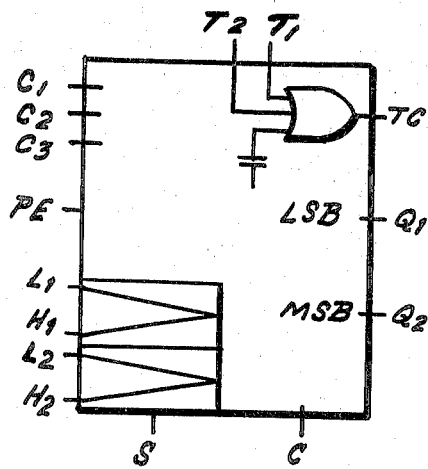
FIG. 17a is a count cell logic symbol.

Count cell operation defined previously in FIG. 2 is summarized in Table I. A count cell logic symbol is shown in FIG. 17a. The count cell symbol is useful in defining UTA functions in larger logic networks. As indicated in Table 1, count cell control signals PE, C1, C2, C3, and TC all are defined for active low counter operation. This is the operative condition. For example, parallel entry is caused when the corresponding PE control signal is in a logic 0 state. Parallel entry is blocked when PE=1. Active low rather than active high control signals are used so that control inputs not required to define count cell operation in a specific application may simply be not connected. Thus, control signals can be pulled low by pulldown resistors connected to all inputs on the UTA LSI die. For example, PE=1 count up operation will be initiated if C=C1+C2+C3=0. Thus, if any of the three count enable inputs is pulled up, count operation will be blocked. If only a single count control input is required in a particular application, the control signal may be connected to C1, for instance, and inputs C2 and C3 may be unconnected. In this case, UTA on-chip pull down resistors force C2=C3=0 and C=C1 will select count or hold modes.

TABLE 1

| COUNT CELL CONTROL FUNCTIONS | | | | | | |
|---|---|---|---|---|---|---|
| | Control Inputs | | | | Outputs | |
| PE | C1 | C2 | C3 | S | Q1 | Q2 |
| 0 | * | * | * | 0 | L1 | L2 |
| 0 | * | * | * | 1 | H1 | H2 |
| 1 | 1 | * | * | * | HOLD | |
| 1 | * | 1 | * | * | HOLD | |
| 1 | * | * | 1 | * | HOLD | |
| 1 | 0 | 0 | 0 | * | COUNT UP | |

TABLE 1-continued
COUNT CELL CONTROL FUNCTIONS

| Output Controls | | | | Output |
|---|---|---|---|---|
| T1 | T2 | Q1 | Q1 | TC |
| 0 | 0 | 1 | 1 | 0 |
| 1 | * | * | * | 1 |
| * | 1 | * | * | 1 |
| * | * | 0 | * | 1 |
| * | * | * | 0 | 1 |

Control Equations $Q1(n + 1) = PE(\overline{C} + Q1(n)) + \overline{PE}(SH1 + \overline{SL1})$ $Q2(n + 1) = PE(\overline{CQ1} + Q2(n)) + \overline{PE}(SH2 + \overline{SL2})$ where $C = C1 + C2 + C3$ $TC = T1 + T2 + \overline{Q1} + \overline{Q2}$

*indicates don't care

Similarly, when count cell one inputs T1 and T2 are not connected, T1=T2=0. Then TC1=T1+T2+$\overline{Q11}$+$\overline{Q12}$ reduces to $\overline{Q11}$+$\overline{Q12}$, and the corresponding TC1 output state will be determined only by the Q11 and Q12 states of the two counter elements in the count cell. In this case TC1 will be low only when Q11 and Q12 are both one, indicating the end of a count cell state sequence Q=0, 1, 2, 3; Q=Q11+2Q12.

Count cell operation may be illustrated further in relation to configuration and operation of multi-stage counters. Large counters of arbitrary size can be formed by chaining count cells together. In the simplest case, the TC output from one count cell in the chain is connected in parallel to count enable and T inputs of the next stage. However, in this configuration the final terminal count output from the chain is delayed unnecessarily, and in effect limits maximum counter operating frequency.

In the chain configuration, the delay through the terminal count output OR-gate, $t_{OR}$ (CS12 in count cell-1) is added at each count cell stage. Thus, for a 2N-bit counter, a delay of $Nt_{OR}$ is added in series with the TC final output. Note that the final TC signal will occur when all but the LSB values are at logic-1 and the LSB reaches one at the next clock edge. The LSB toggles at the maximum clock rate. Thus, the delay in the terminal count output can require a clock rate reduction to $1/Nt_{OR}$. Delay in series with count enable inputs can limit maximum counter operating frequency in a similar manner.

Figure 18A:
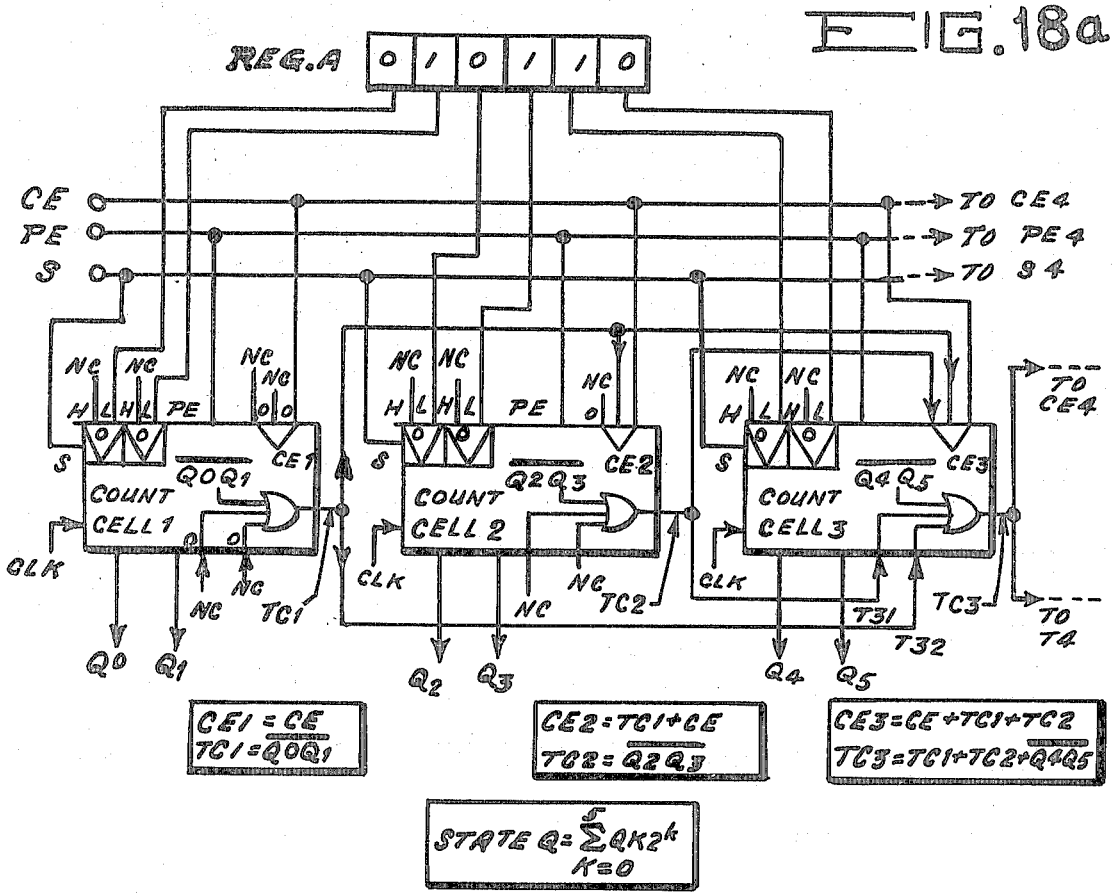
FIG. 18a is a logic diagram illustrating counter configuration.

Count enable and terminal count delays may be reduced using count enable and terminal count look ahead connections. For short chains these may be implemented as depicted in FIG. 18a. In look ahead configuration, TC1 output from the first count cell is fed to a count enable input of the second and also in parallel to a count enable input of the third count cell. TC1 and TC2 outputs are fed in parallel to T31 and T32 inputs of the third counts. For the case shown, a common count enable signal is fed in parallel to one of the count inputs of the three counter cells. Were this input not used for parallel control, the count enable look ahead chain could be extended to four stages. In this case, the count enable inputs on a fourth 2-bit count cell would be connected to TC1, TC2, and TC3 outputs from the first three cells.

Maximum terminal count look ahead chain length is three count cells for 6-bit counters, if the configuration shown in FIG. 18a is used. However, an external OR gate may be added in an appropriate manner to limit the delay from LSB terminal count signals to the final terminal count output to at most one gating state.

The other control signals, PE and S may be connected as is shown in FIG. 18a for multi-stage counter configuration. The parallel entry data signals may be connected to separate registers. In FIG. 18a the L inputs are connected in parallel to register A and the H inputs are not connected.

For N-stage counters, the total counter output state Q may be represented as $$Q = \sum_{K=0}^{N} QK(2^K)$$

with counters configured in the manner shown in FIG. 18a, the state Q will increase by one at every leading clock edge.

Figure 18B:
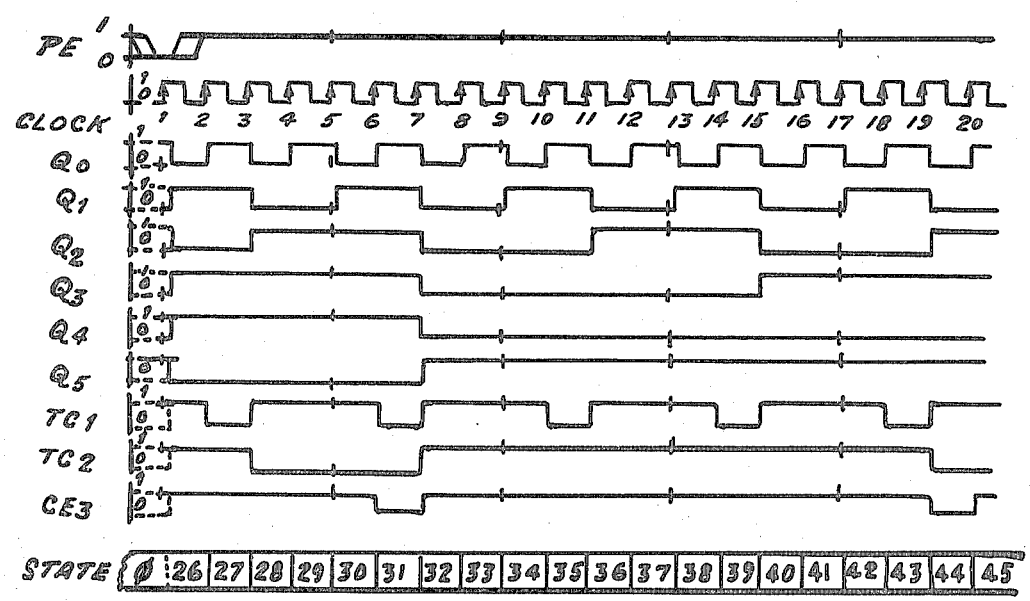

Counter operation is suggested in the timing diagram of FIG. 18b. In the case considered, control input CE and S are both at logic 0 and constant. Preceding clock edge-1, PE falls to 0 and remains at 0 during clock edge. Subsequently, PE rises to logic-1 before the next clock edge and remains at logic-1 thereafter. With S=0 the L inputs are selected and when PE=0 at the first clock edge, the contents of register A (0, 1, 0, 1, 1, 0) corresponding to stage Q=26 are entered in the counter immediately following clock edge-1. However, the counter outputs are delayed slightly by the slave response time. Then counter operation proceeds in the manner shown in the timing diagram. As indicated previously, Q=26 is loaded at clock edge-1; then with Q11=0, Q11=1, the count enable gating inside the first count cell prevents the second flip flop from toggling at the second clock pulse. Thus, at the second clock pulse Q0 changes but Q1 does not. After the second clock pulse Q0 and Q1 both equal one, and therefore, the terminal count is TC1=0. Thus, at the third clock pulse count enable input to the second count cell is low and output Q2 changes state. After terminal count signals are generated in a similar manner as shown in the terminal output waveforms at the bottom of the timing diagram in FIG. 18b.

UTA MICROCONTROLLER DESIGN

Classically, timing and control networks were built using counters and decoding their Q outputs in SSI random logic networks to generate control signals. In these networks the random logic decoders implemented a mapping function from the counter binary state vector to a control vector composed of the individual control signals. Then as the counter state sequence progressed corresponding sequences of one and zero control signals were generated. Special random logic decode networks were designed to provide the control signal sequences required by each application.

With the advent of mass produced semiconductor ROM components the random logic network could be replaced by a bank of ROM ICs. However, an alternate approach is more efficient; in the alternate approach a microcontroller is configured in the manner shown in FIG. 19. Q outputs from a program counter are fed to ROM address inputs. The ROM output words are separated into two fields. The first, the control field, may be further decoded as suggested in FIG. 19 through additional logic circuitry or used directly as control vectors. The second field, the sequence ROM output field, is fed back to the counter. Selected bits in the sequence field are connected to counter controls while other bits are connected to counter parallel data entry points.

Microcontroller networks configured in this manner operate as follows. A sequence of counter states is mapped through the ROM to a sequence of control vectors. Counter operation is continuous until a state is reached at which the counter control bits in the ROM output sequence fields cause the counter to stop and parallel enter a new state vector. The new state vector is composed of additional bits in the output ROM sequence field. On the next and succeeding clock pulses the counter resumes operation beginning with the new state. Thus, a micro-controller performs the same function as a classical decoded counter structure. However, in microcontrollers, ROM decoding of only useful state sequences is performed. Other state sequences not required for controls are skipped over. Therefore, the decode function is simplified and the corresponding decode network complexity (for example the number of ROM chips) is reduced.

Further reduction of decode network complexity or equivalently ROM capacity may be achieved by adding microcontroller modes. For example, a control vector which is constant over a period of several clock cycles is required in many applications. In addition, repeating a particular control sequence several times is frequently desirable. Other applications require a change from one control sequence to another in response to an external input, such as one caused by a previous control output.

Figure 19:
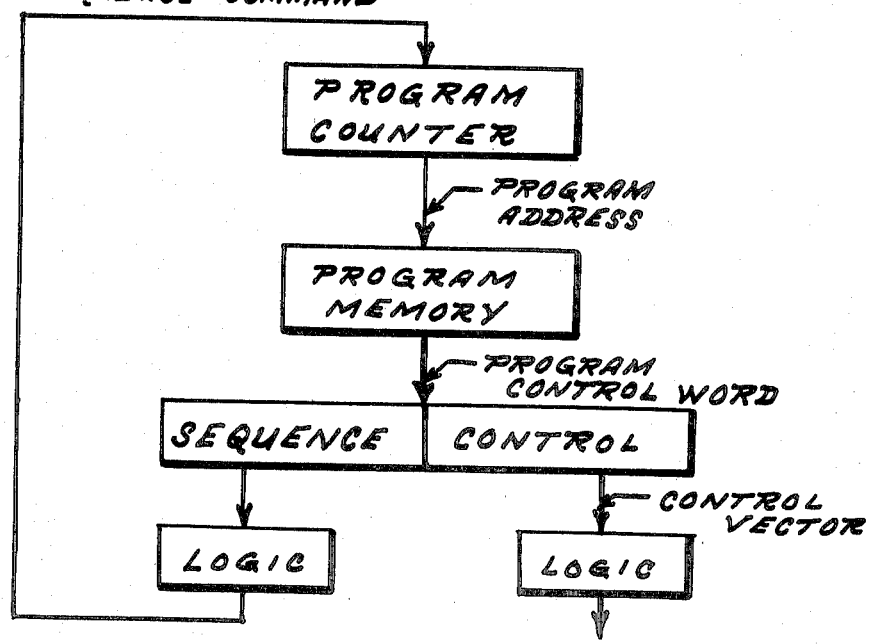
FIG. 19 is a block diagram of a basic microcontroller design.

A microcontroller configured in the manner shown in FIG. 19 can perform these functions but only at the expense of increased ROM capacity. For example, a control vector constant over several clock cycles may be generated by storing the same output at a sequence of ROM addresses. In this case the number of constant ROM words stored will equal the number of clock cycles for which the output is to be constant. Similarly, if a sequence is to be repeated n times, then n times as much ROM storage is required.

Figure 20B:
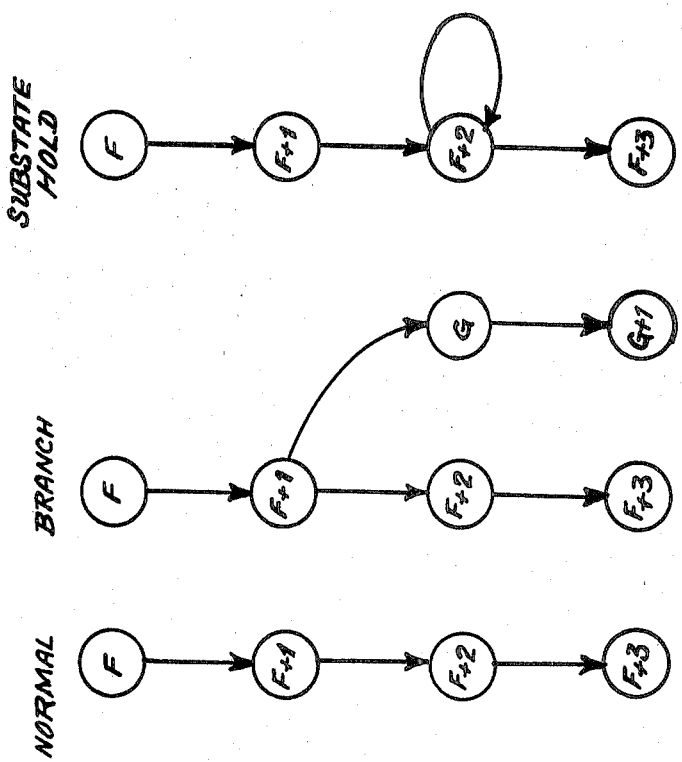
Figure 20A:
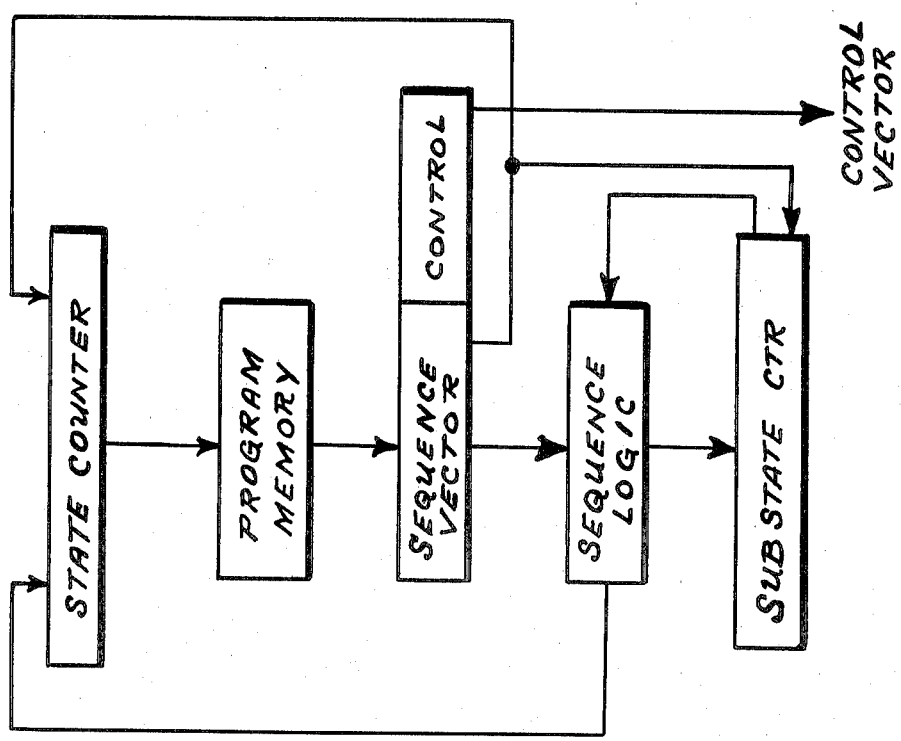
FIG. 20a is a block diagram of a basic microcontroller with substate timing, branching and incrementing features.

These inefficiencies may be eliminated by adding micro-control features for substate holding, looping, and branching. A corresponding microcontroller simplified block diagram and state diagram are shown in FIGS. 20a and 20b. Substate timing performed by the configuration in FIG. 20a can generate a constant state and therefore constant control output for several cycles. In effect, the substate counter measures the number of clock cycles for which constant output is required and prevents the state counter from incrementing for that duration.

The UTA can be used to configure microcontrollers with substate, timing, looping, and other features such as subroutine execution. A key element in these configurations is the control function performed by the UTA branch and increment logic network.

Figure 17B:
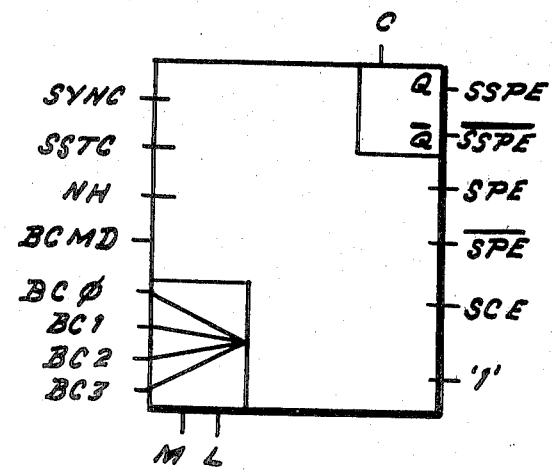
FIG. 17b is a branch and increment logic symbol.

A branch and increment logic symbol is shown in FIG. 17b. Branch and increment control functions are defined in Tables 2 and 3 in the context of branch and increment logic application in microcontrollers. The manner in which microcontrollers are configured using branch and increment logic is discussed further here.

As indicated previously, the basic microcontroller of FIG. 19 may be enhanced to perform substate holding, branching, and incrementing as suggested in FIG. 20a.

Figure 21:
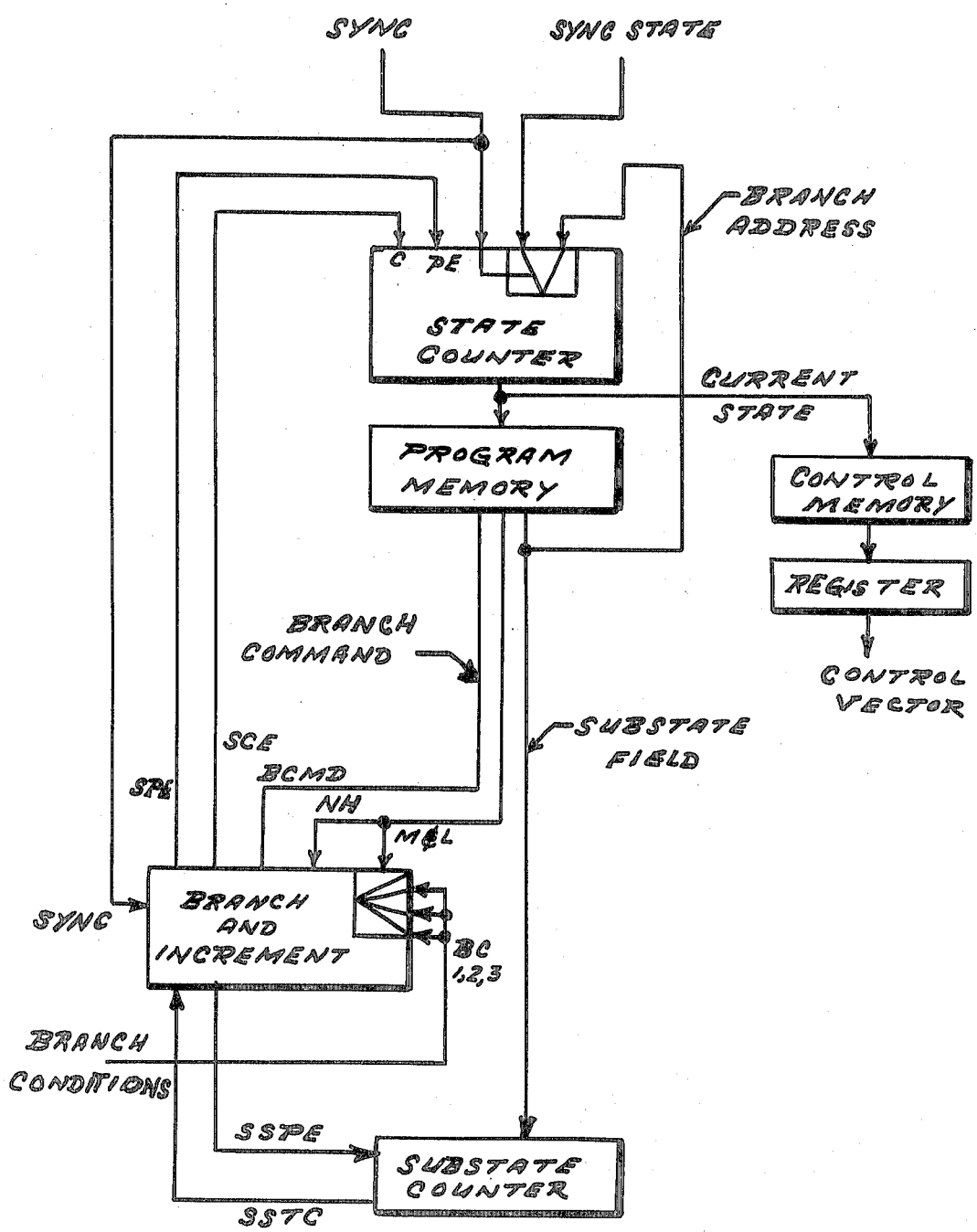
FIG. 21 is a block diagram of a microcontroller with substate holding.

A detailed block diagram for UTA implementation of the general microcontroller design is shown in FIG. 21. In FIG. 21 counter length and ROM memory size are not specified because the configuration is usable over a range of applications. Accordingly, counters may be configured as suggested in FIG. 18a using multiple UTA count cells; however, a branch and increment logic network from only a single UTA is required to implement the microcontroller. The count cell capacity of a single UTA is adequate to implement the microcontroller for small word lengths (e.g., a six bit state counter and a 2 bit substate counter may be built using a single UTA.)

The microcontroller is configured with branch and increment logic SCE and SPE outputs fed to a state counter and an SSPE control output fed to a substate counter. Substate counter terminal count is input to the branch and increment logic. In particular, note that three ROM output bits are fed to the branch and increment logic at the BCMD, M, and L inputs. Either the M or L signal is also connected in parallel to the branch and increment no hold (NH) input.

A UTA microcontroller configured in the manner shown in FIG. 21 executes substate timing, incrementing, and branching functions in either of two basic modes. In the first, type-I timing is used; type-II timing is used in the second mode. In type-I timing, each state uniquely determines the next and all operations performed are single state operations. In type II timing next states and sequential events are mapped not from an individual state, but from a sequence of states. For example, state F+1 shown in FIG. 20b sets up a conditional branch condition without requiring any information from previous or following states. Whether or not the branch condition occurs depends only on external conditions tested via branch logic during state F+1.

Figure 22:
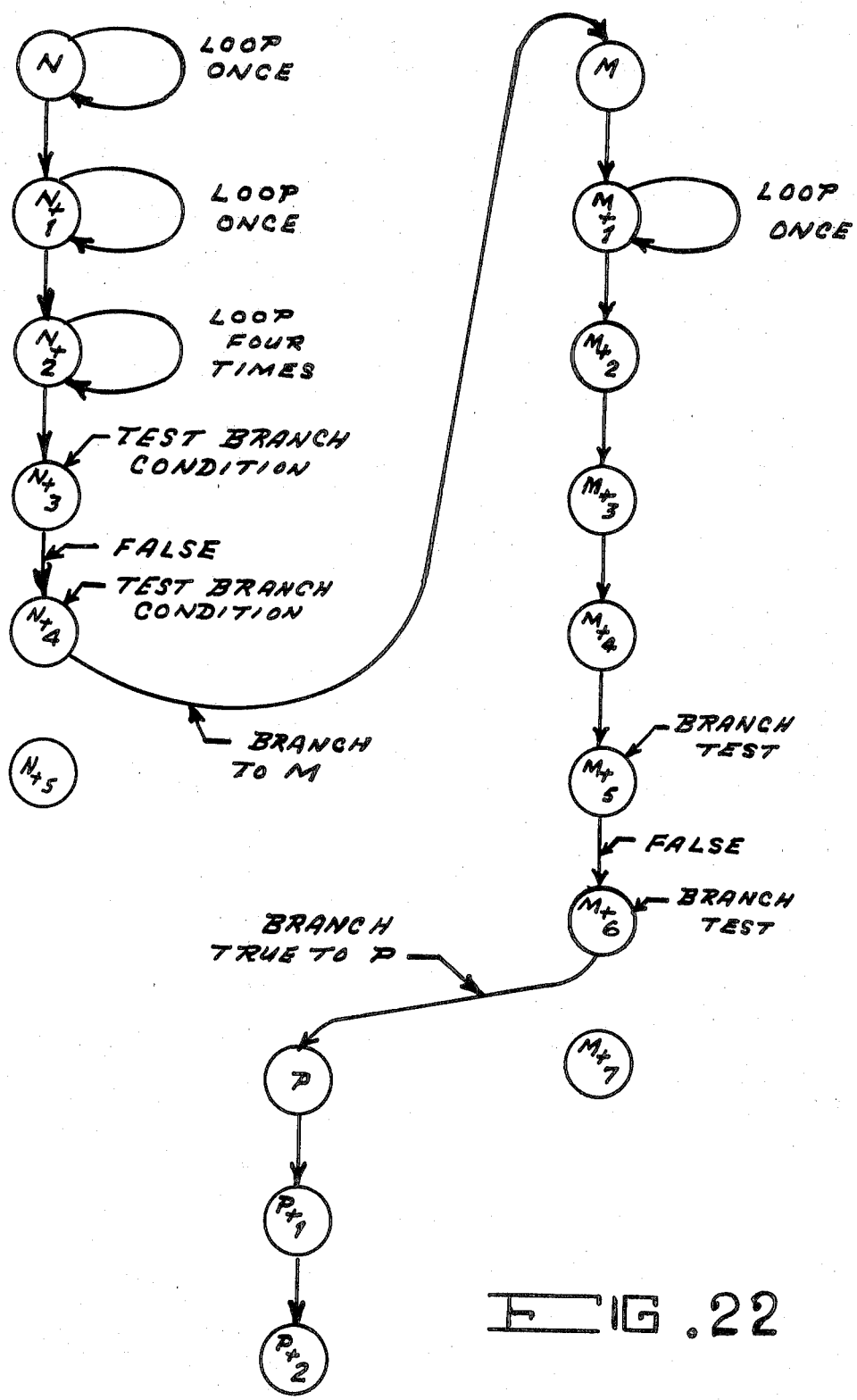
FIG. 22 is a state diagram for microcontroller type I timing.
Figure 23:
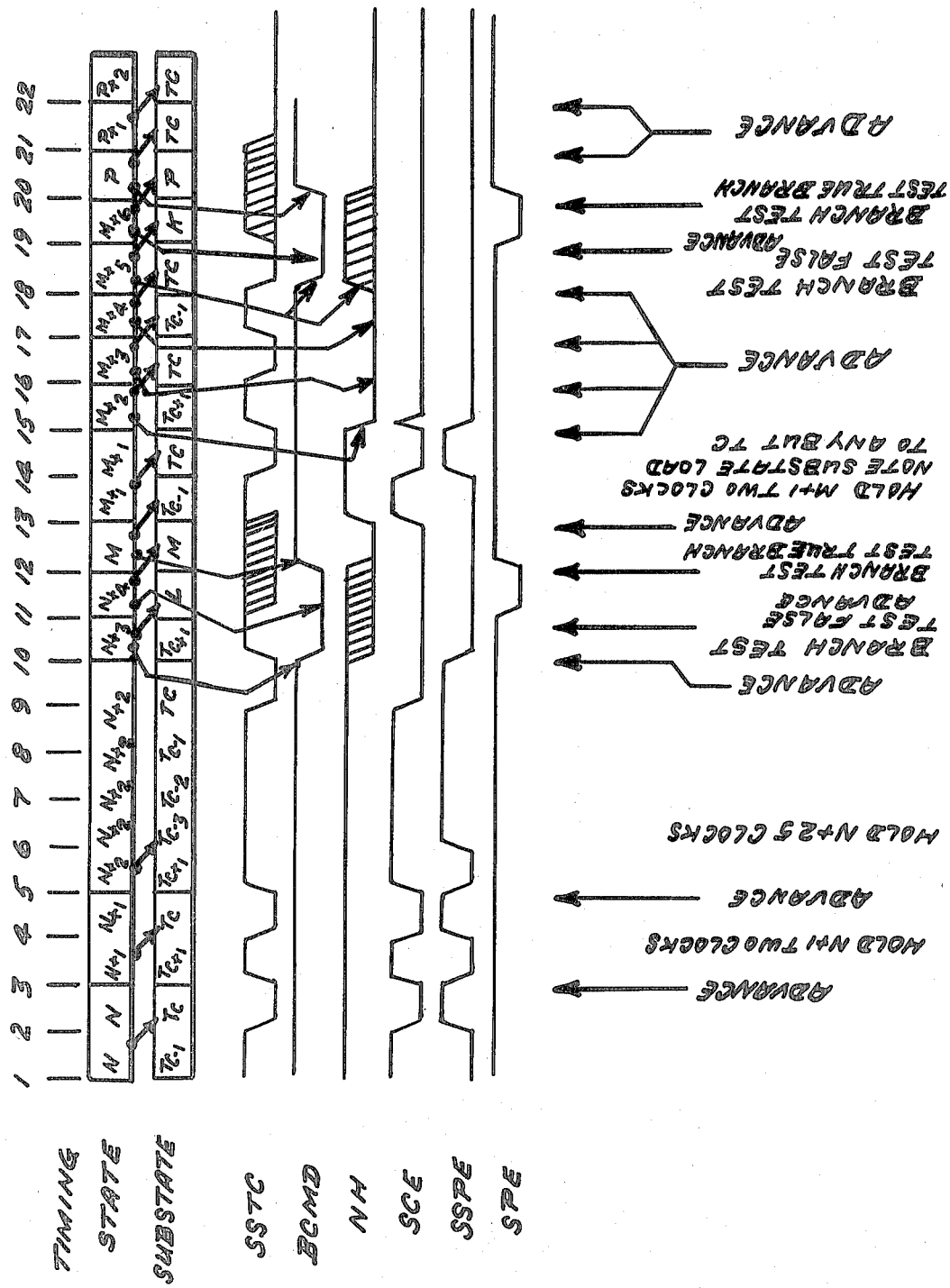
FIG. 23 is a microcontroller type I timing diagram showing branching and substate holding.

FIG. 21 micro-controller operation in a type-I timing mode is illustrated in a state diagram and a timing diagram, FIGS. 22 and 23, respectively.

Figure 24:
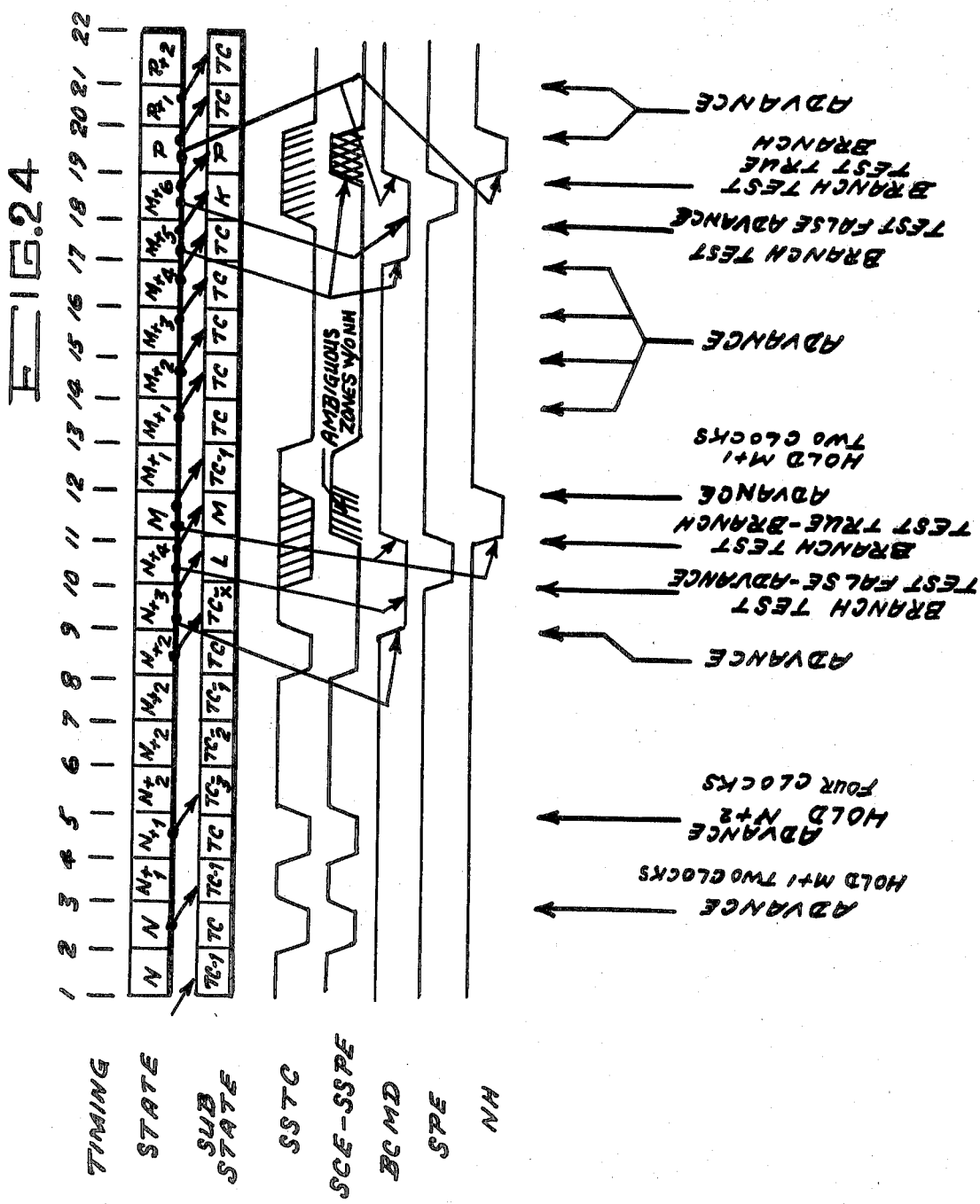
FIG. 24 is a microcontroller type II timing diagram showing branching and substate holding.

Substate holding is performed during the first sequence of clock cycles shown in FIG. 23. Corresponding state transitions from N to N+2 are shown in FIG. 24. Over the sequence, SYNC+1 and ROM outputs BCMD, M, L, and NH all are at constant logic-1 value. The branch and increment logic control equations reduce to SPE=1, SCE=SSTC, and SSPE(n+1)=SSTC(n). Only SSTC changes, causing corresponding changes in SCE and SSPE.

TABLE 2

BRANCH AND INCREMENT CONTROLS

Branch Command
  BCMD = 0 Causes testing of branch condition R to see if
           R = 0.
Synchronize
  SYNC = 0 Causes synchronization of the state counter to
           a known state equal to selected data inputs,
           regardless of internal state.
Substate Terminal Count
  SSTC = 0 Indicates the substate counter has reached the
           all one's state.
No Hold
  NH = 0 Indicates the current state count is to have
         the duration of one clock period; otherwise,
         the minimum hold time is two clock periods.
State Counter Parallel Enter
  SPE = 0 Causes parallel entry into the state counter;
         overrides all other state counter input
         controls.
State Counter Count Enable
  SCE = 0 Enables state counters for count mode providing
         the SPE = 0.

TABLE 2-continued
BRANCH AND INCREMENT CONTROLS

Substate Counter Parallel Enter
SSPE = 0  Causes parallel entry into the substate
counter; overrides all other substate counter
input controls.
SSPE is functionally equal to SCE, but is
delayed one clock period; i.e., SSPE (n + 1) =
SCE (n). This slaves the substate counter to
the state counter by delaying substate PE until
after state PE. This also delays Substate
Terminal Counter by one cycle and thus holds
state counter one cycle longer.

TABLE 3
BRANCH-INCREMENT CONTROL FUNCTIONS

| Multiplex Function | | | Inputs | | | Output |
|---|---|---|---|---|---|---|
| M | L | R | R | BCMD | SYNC | SPE |
| 0 | 0 | BC0 | * | * | 0 | 0 |
| 0 | 1 | BC1 | 0 | 0 | * | 0 |
| 1 | 0 | BC2 | 1 | * | 1 | 1 |
| 1 | 1 | BC3 | * | 1 | 1 | 1 |

| Inputs | | | | Output |
|---|---|---|---|---|
| SYNC | BCMD | NH | SSTC | SCE |
| 0 | * | * | * | 0 |
| * | 0 | * | * | 0 |
| * | * | 0 | * | 0 |
| * | * | * | 0 | 0 |
| 1 | 1 | 1 | 1 | 1 |

| Input | Output |
|---|---|
| SCE(n) | SSPE(n + 1) |
| 1 | 1 |
| 0 | 0 |

Control Equations $$R = \overline{ML}(BC0) + \overline{M}L(BC1) + M\overline{L}(BC2) + ML(BC3)$$

$$SPE = SYNC \cdot (BCMD + R)$$
$$SCE = SYNC \cdot BCMD \cdot NH \cdot SSTC$$
$$SSPE(n + 1) = SPE(n)$$

*indicates don't care

Assume that the controller is initially in state (N) at clock-1 as shown at the left of FIG. 23. The substate counter is assumed to be in the TC-1 state. Then after the clock 2 transition, Substate Terminal Count (SSTC), is reached causing State Count Enable (SCE) to fall to an active low state. On clock 3 the substate counter advances beyond terminal count and SCE is disabled. Substate Parallel Enter, (SSPE), becomes active (low) so that on clock 4, the substate counter is parallel loaded from the sequence field of program memory to the terminal count state. SCE is set and SSPE reset. On clock 5 the state counter increments to (N+2). On clock 6 the substate counter is loaded with (TC-3) from program memory. Thus, a 5 cycle hold period is executed beginning with clock edge 5 and ending at clock 10.

Notice that, with only the controls used so far, the minimum substate hold period is two clock cycles. No hold control operation is required to effect one cycle substate hold instructions. The No Hold (NH) signal is driven from the program memory output sequencing field. NH operation is illustrated at the sequence beginning on clock 15 in FIG. 23. The current state is (M+2) and the substate is (TC+1). At clock 15 NH becomes active forcing SCE low. SSPE is active due to the previously active (low) SCE state. At clock 16 the state counter increments to (M+3) and the substate counter is parallel loaded to (TC). Thus, as indicated at clock edge 15, if NH is activated immediately upon entering a new state, its duration is limited to a single clock period.

Branching is performed by the microcontroller in the manner shown at state N+3 in the FIG. 22 state diagram. Branch timing is shown beginning after clock 10 in FIG. 33. The state is (N+3) during cycle 10. Branch command, (BCMD), is active and SSPE and SCE are active during cycle 10, respectively, because of the previous SSTC and current BCMD states. At clock 11 the results of a branch test on the conditions present at the multiplexer inputs determine the next state. In the sequence shown in FIG. 22 the test fails (R=1) and thus SPE=1 at clock 11. In the situation shown in FIG. 23 the state counter increments to (N+4). The next operations depend on ROM contents. The substate counter is loaded with the branch address because the ROM substate field is fed to both the state counter branch input and substate counter data input (see FIG. 21). Another test is made and is successful. Thus SPE is active (low) after clock 11, i.e., during cycle 12 and both the state and substate counters are loaded with the branch address (M) at clock edge 12. Notice that the NH state does not effect the above sequence and NH is shown as unknown during branch testing in FIG. 23. This results because NH does not effect operation in this mode; it shares program memory output with the branch condition address (M or L). Address sharing is permissible because the effects of these controls are mutually exclusive.

Once a branch had been executed successfully, the branch state, (M) may be held for one or more clock periods. If it is held for a single clock period as shown, the substate counter may be resynchronized at clock 13 by loading it to an appropriate state. If that state is the terminal count, the state counter advances beyond state (M+1) on the next clock edge.

Type-II utilizes information from the previous and current states (n1) and n to determine the value of the next state (n+1). In type-I operation the current state is held for a period determined from the current state vector, while in type-II the substate hold period is determined from the previous state vector. Thus, the one cycle time delay from SCE to SSPE is not required in type-II operation. The maximum substate hold period for type-I timing is the substate count length plus one clock cycle. In type-II timing the hold period is just the substate count length. Thus, NH is not required for count control in type-II operation. Single cycle holding may be initiated by substate loading only. However, a new control is required to remove state ambiguity following a successful branch. When a branch is executed successfully SCE and SSPE states are not known precisely. Therefore, they must be forced to a known state. The NH signal developed in the branch and input logic will perform this function and NH may still occupy a shared bit with the branch condition address. Type-II timing is illustrated in FIG. 24.

The SYNC input to the FIG. 21 microcontroller is used to synchronize its operation with a master timeline. When SYNC is enabled, a parallel entry is performed overriding all other control functions. This results in an unconditional branch to a known starting state (i.e., the SYNC state input). The SYNC feature is used for initial startup of master sequences and for system testing.

Figure 25:
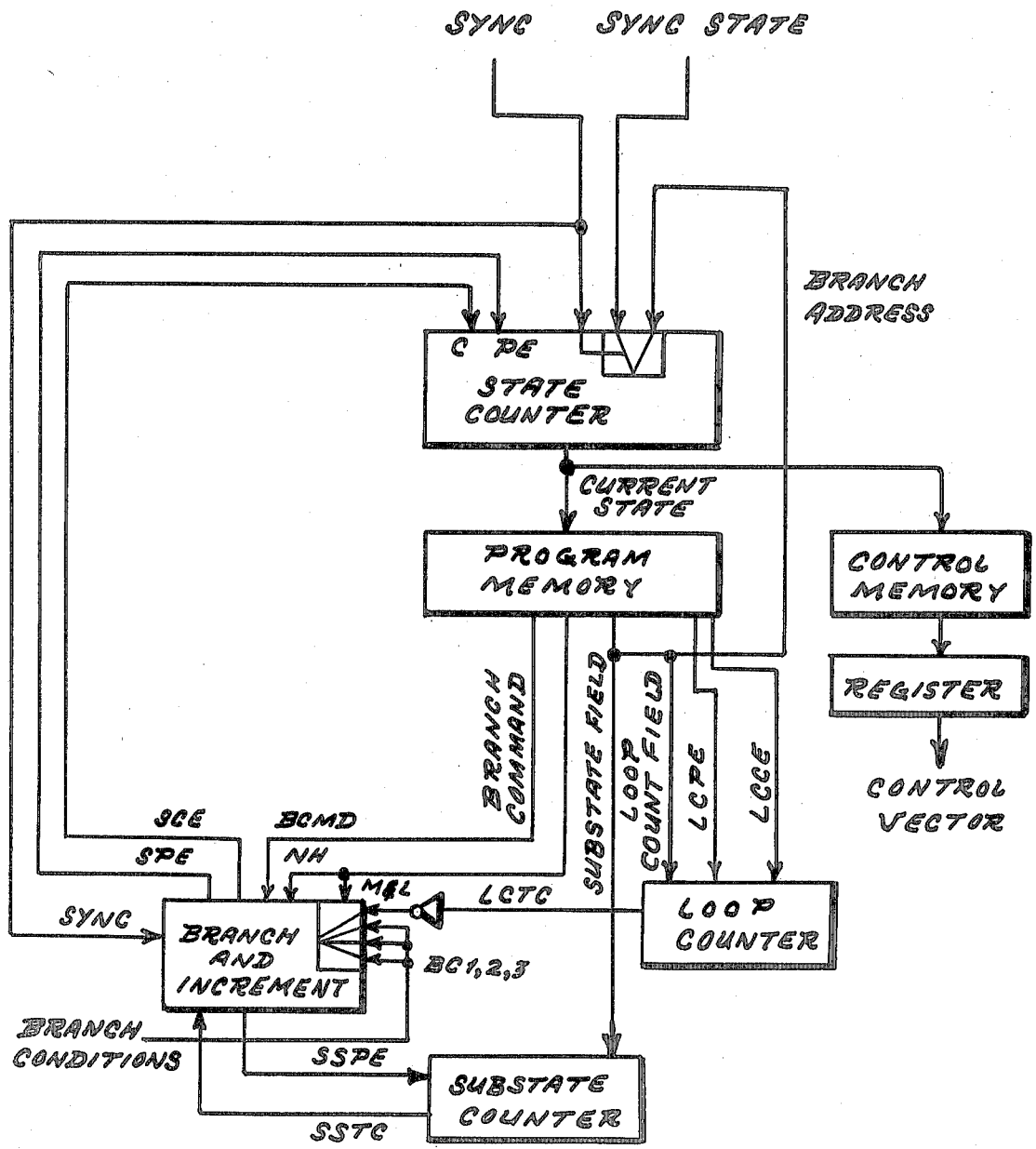
FIG. 25 is a block diagram of a microcontroller with loop counter.

A UTA microcontroller with provision for executing repeat loops may be configured by adding a loop counter to the network shown in FIG. 21. In addition, ROM output bits must be dedicated to loop control, and corresponding ROM output signals must be connected to the loop counter. FIG. 25 shows the UTA microcontroller block diagram with these changes. The loop counter is shown at the right of the diagram. The loop counter terminal count output is fed to a branch and increment logic input to provide for conditional termination of a loop. Two loop counter control bits, loop counter PE (LCPE) and loop counter CE(LCCE) are fed to the loop counter from the ROM. No Hold (NH), Branch Command (BCMD), Loop Counter Parallel Enable (LCPE), and Loop Counter Count Enable (LCCE) are included in the program memory sequence field.

A state diagram showing loop execution and a corresponding timing diagram are presented in FIG. 26. Although any combination of substate holding and branching can be executed by the microcontroller, only single cycle instructions are illustrated in FIG. 26.

With appropriate ROM programming, LCPE is low (active) during state (N) and therefore the loop counter is loaded at clock 2. With parallel data inputs unconnected as suggested in FIG. 27, all zeros will be entered in the loop counter. Therefore, if a 2-bit loop counter is used its state will be set at TC-2 +1 or TC-3 after parallel entry, causing a control sequence to be repeated three times.

With appropriate ROM programming LCCE is made active on the first state of the loop causing the loop counter to increment at clock 3. At the last loop state (N+3) an active BCMD ROM output causes a branch condition test of the loop counter terminal count output state. Note that LCTC is fed through an inverter to BCO in FIG. 25. Thus, if the test is successful (LCTC≠0). In FIG. 26, LCTC≠0 at N+3 and therefore a branch to an address in the ROM address field is initiated at (N+3).

The loop may be left prematurely by conditional branching at any state preceding the final state, (N+3). When the loop count terminal count is reached the branch test will fail, (LCTC=0), and incrementing to state (N+4) will occur on clock 11.

Subroutine execution is more complex than the operations described previously. A UTA microcontroller capable of executing subroutines requires a push-down/pop-up stack memory, a stack pointer, address incrementer, delay register, and provisions for generating write control signals. A block diagram of a microcontroller designed for executing subroutines as well as all operations described previously is shown in FIG. 27. State and timing diagrams defining its operation are presented in FIGS. 28a and 28b.

Figure 27:
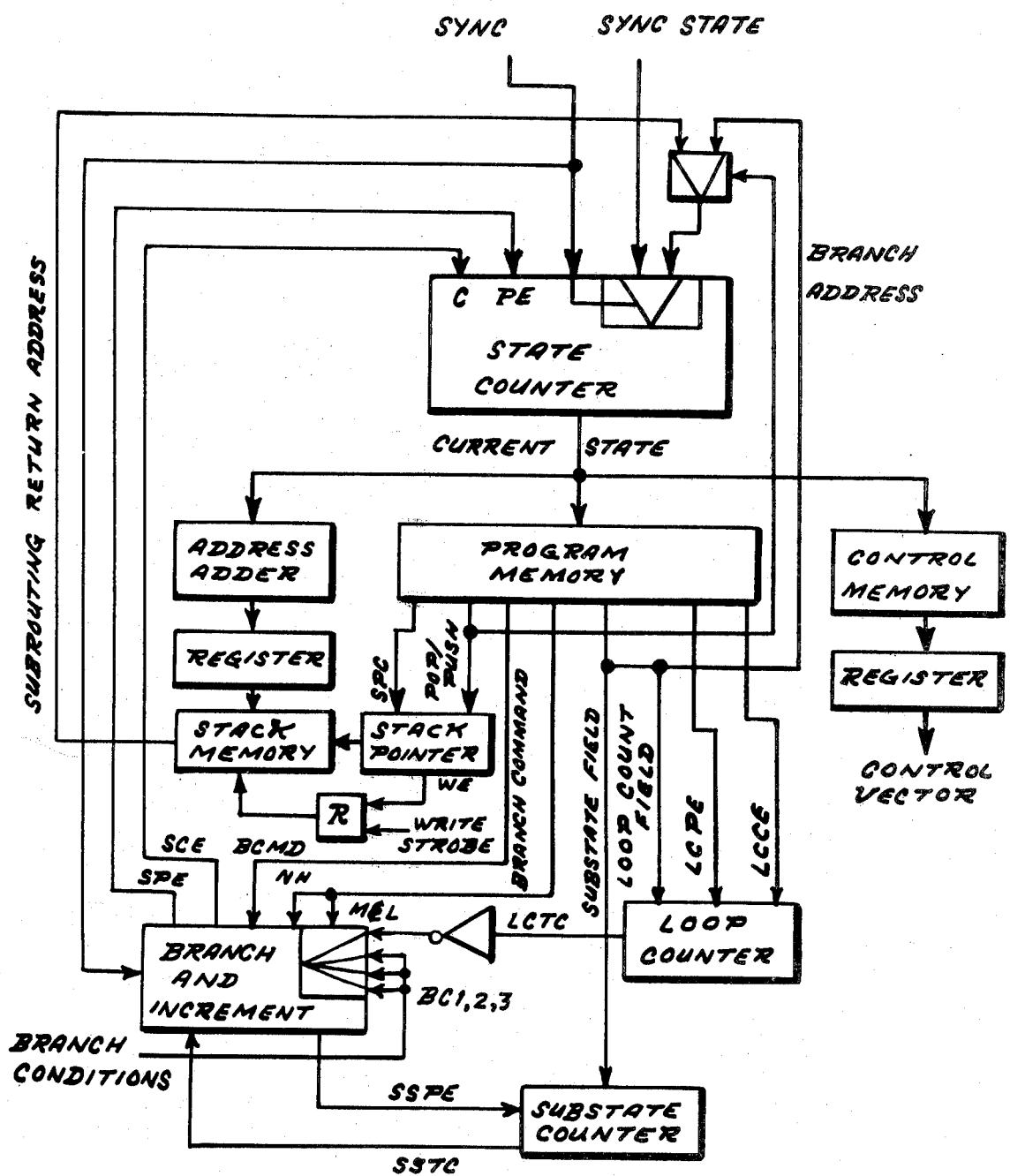
FIG. 27 is a block diagram of a microcontroller with subroutine capability.

In the microcontroller design shown in FIG. 27 a current address from the state counter is incremented in an address adder, delayed through a register and fed to a push down/pop up stack memory. These operations require one clock cycle to perform. During this clock cycle program memory outputs are decoded by the stack pointer logic generating write enable (WE) signals for the stack.

A one clock cycle delay is required to permit subsequent execution of all main program instructions during a one cycle period. The one cycle delay also permits time for the stack pointer to generate a valid return address. Return address generations is performed using push-down/pop-up instructions which initiate the read, write and increment control sequences shown in Table 4.

TABLE 4

| PUSH/POP INSTRUCTION SEQUENCE | | |
|---|---|---|
| Program Memory Push/Pop SPCE | Instruction | Function |
| State 1 | Pop | Read return address then decrement |
| State 2 | Hold | Hold Pointer |
| State 3 | Push | Increment then write return address |
| State 4 | Hold | Hold Pointer |

Because random access memories (RAMs) rather than registers are used for stack memory, at least two clock cycles are required for subroutine execution. One cycle is required to read the RAM and another for RAM data storage.

Figure 28A:
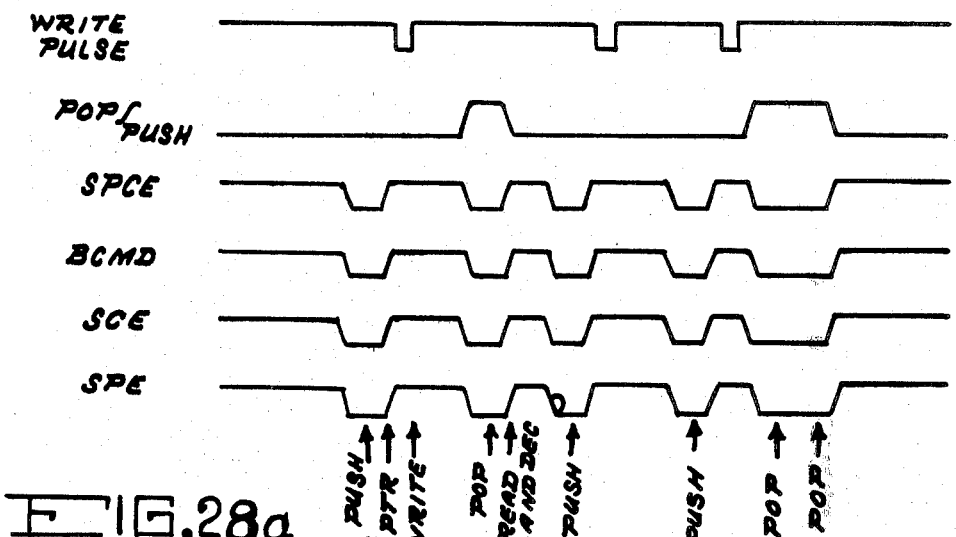
FIG. 28a shows the timing diagram for a microcontroller with subroutines.
Figure 28B:
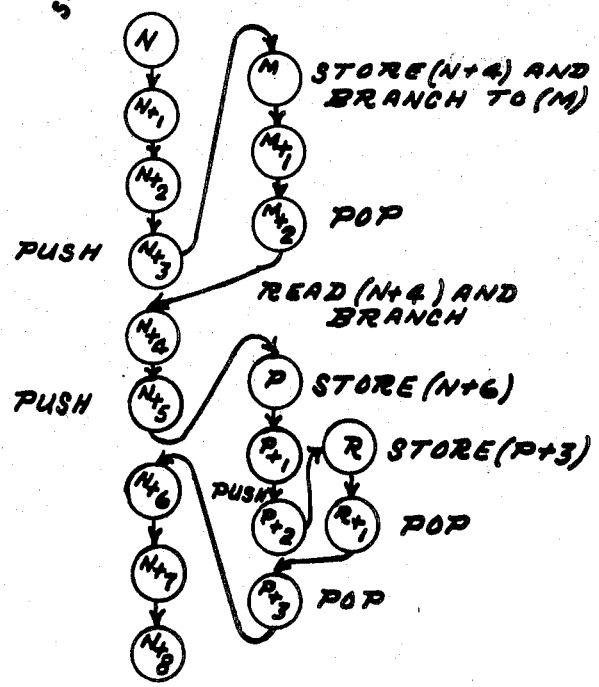
FIG. 28b shows the state diagram for a microcontroller with subroutines.

The subroutine timing diagram of FIG. 28a shows entry and return from a subroutine and also nesting of two subroutines. The truth table for stack control is given in Table 5. This displays a specific decode scheme arbitrarily defined to describe subroutine execution. The ROM data addressed at state (N+3) contains a push instruction. BCMD is active and a branch to subroutine is executed which may be conditional or not conditional. On clock 5 the branch occurs and the stack pointer advances to (S+1). The stack input now corresponds to state (N+4). A write pulse is generated during this period to write the return address into the stack. To return from subroutine state (M+2), a pop instruction is issued. The stack output is the valid return address (N+4), and BCMD is asserted. Upon branching at clock 8, state (N+4) is parallel entered into the state counter, the stack pointer is decremented to (S), and the main program continues.

TABLE 5

| STACK CONTROL FUNCTIONS | | | |
|---|---|---|---|
| | Controls | | Functions |
| Mode | POP/PUSH | SPCE | STK POINTER | MEMORY |
| PUSH | 0 | 0 | Increment | Write |
| | 0 | 1 | Hold | Read |
| POP | 1 | 1 | Decrement | Read |
| | 1 | 1 | Hold | Read |

ROM data at state (N+5) contains another push instruction causing a subroutine branch to (P), incrementing stack pointer to (S+1), and writing (N+6) into the stack. State (P+2) pushes again, branching to (R), incrementing the stack to (S+2), and writing (P+3) into the stack. State (R+1) pops (P+3) from the stack, decrementing the pointer to (S+1), and the program returns to (P+3). State (P+3) is another pop causing the program to return to (N+6), which is the current return address in stack location (S+1). The stack pointer then returns and the main program resumes at state (N+6).

Figure 29:
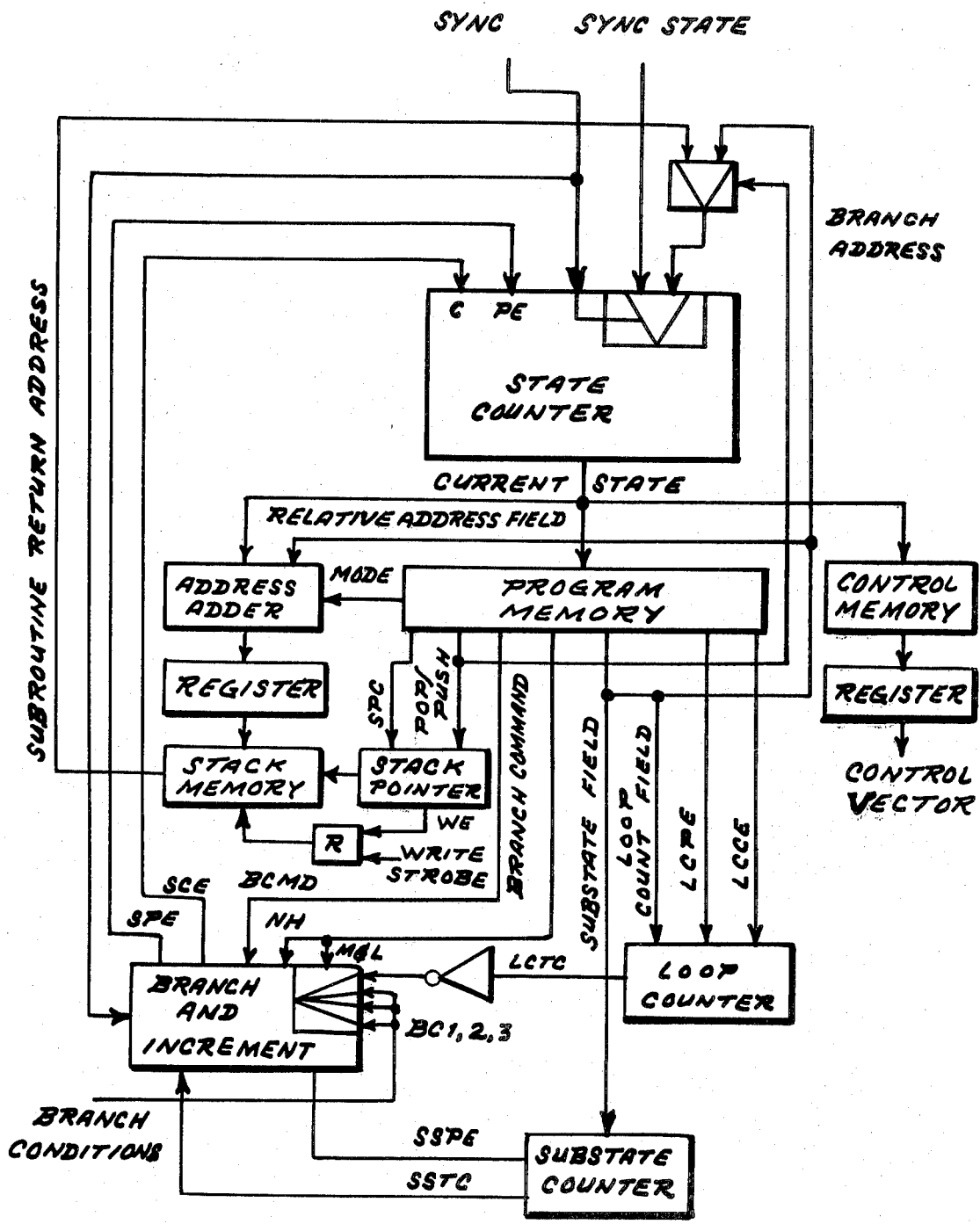
FIG. 29 is a block diagram of a microcontroller with relative branching.

In some applications, addressing within a relocatable block of instructions is required. This addressing may be performed with a microcontroller similar to the one shown in FIG. 27, but modified by replacing the address adder with an ALU and by providing extra ROM output bits to control the ALU, FIG. 29 shows a microcontroller network with the appropriate modifications. The ALU at the left of the diagram performs the add or subtract operations necessary to increment or decrement the address. State and timing diagrams illustrating execution of relative addressing by the FIG. 29 microcontroller are given in FIGS. 30a and 30b.

As shown in FIG. 30a, a "push address (A+B)" instruction is executed without branching at state N+1. The state counter is incremented at clock 3. State (N+2) is a 'no operation' state to allow time for writing (N+1+A) into the stack. At State (N+3) a normal subroutine return instruction is executed. Note that the return address is (N+1+A) rather than (N+2).

Throughout this microcontroller discussion entry into and exit from modes of operation have been mutually exclusive. This allows branch address, loop count, substate count, and relative offset packing in the same program memory field. If these operations are designed to be non-exclusive, more intricate modes are possible. For example, relative subroutine returns can be executed in the same manner as the relative branches described previously. For relative returns, however, BCMD is asserted at clock 9 of FIG. 30a, causing a branch to a subroutine address to be read from the program memory and a relative return address to be stored in the stack. (The offset must reside in a separate program memory field because it is not exclusive relative to the branch address.) In returning from the subroutine a pop to the current stack contents, (N+A+1), at clock 11, returns operation to the relative position in the main program.

UTA COMPONENT APPLICATIONS

As indicated previously, UTA circuits may be used in microcontroller and other timing control networks. In non-microcontroller applications UTA count cells and branch and increment logic elements may be used independently to perform flip flop and gating functions, or used in groups to implement registers and counters. Branch and increment logic applications are described subsequently. UTA count cell applications are described further here.

Individual UTA count cells can be connected to implement SSI functions in the manner shown in FIGS. 31a, 31b and 31c. In the multiplexing register function in FIG. 31a selected inputs are loaded at each rising clock edge. The terminal count output $TC = Q1 \cdot Q2$ is generated immediately following the clock edge.

A $\overline{JK}$ flip flop may be configured in the manner shown in FIG. 31b. Because mode controls are shared by both flip flops in UTA count cells, only one of the two flip flops in a count cell is used efficiently in the $\overline{JK}$ flip flop configuration. However, the multiplexing input to the second flip flop may be used to derive an enable buffered output Q signal at the cell TC output in the manner shown.

A similar count cell network may be configured to implement a D flip flop in the manner shown in FIG. 31c. As in the case of the JK flip flop, a second count cell flip flop function is not used efficiently. Again, however, a buffered Q output may be derived at the count cell TC output.

Figure 32A:
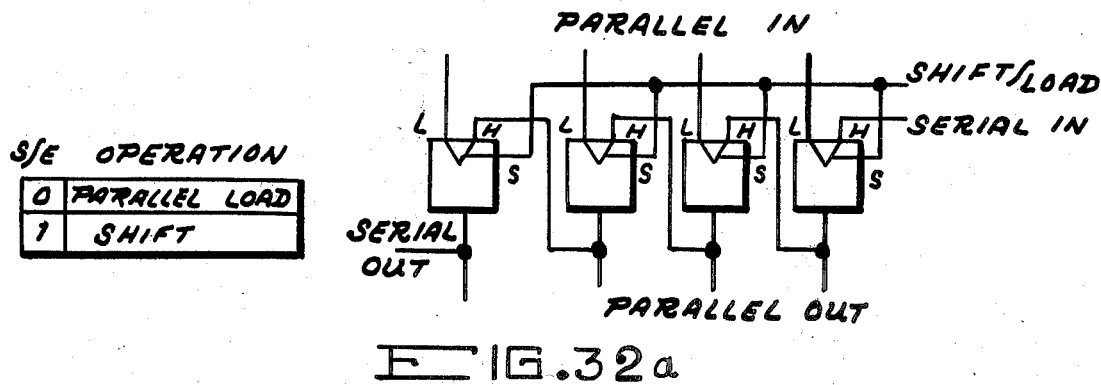
FIG. 32a illustrates a UTA shift register design.

The shift register shown in FIG. 32a is implemented by busing UTA MUX select inputs together and feeding each Q output to a next stage input. The shift register operates in either shift or load modes so that data may be entered in either serial or parallel fashion. The basic shift register design shown in FIG. 32a may be enhanced with the addition of input multiplexing functions to perform programmable right or left shifting.

Figure 32B:
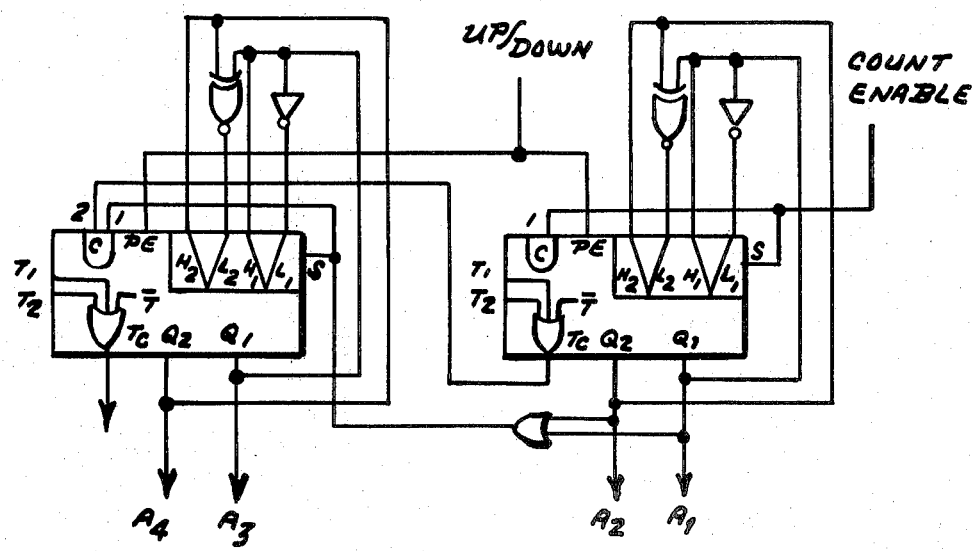
FIG. 32b illustrates a UTA counter design.

The 4-bit up/down counter which can be implemented using UTA count cells plus additional external gating is shown in FIG. 32b. The gating may be implemented by UTA branch increment logic elements or external MSI/SSI parts. Upcounting in the normal UTA mode is enabled when PE=0 and C1=C2=C3=0. Holding in the upcount mode is effected by raising the common CE line to a logic-1 value. In the count down mode, the next state LSB in each count cell must be set to the complement of the LSB for the current state. The next state count cell MSB must be derived as the EXCLUSIVE-NOR of the count cell current state outputs. The EXCLUSIVE-NOR and inverter gating shown above the count cells performs these functions. Because the terminal count state for the downcounter is 00 (rather than 11 in an upcounter), an additional external OR-gate shown below the diagram is used to develop the terminal counter signal.

Up/down counter cell chaining is affected by connecting the down-terminal count output from one cell to the MUX select and count enable inputs of a next cell. The up-terminal count output is connected in parallel to an additional next cell count enable input.

The external gating necessary to implement the up-/down counter introduces delay in the control signal paths and thus reduces maximum count clock frequency. However, the count may be used in applications such as RAM stack control where memory cycle time is greater than the counter cycle time even with the additional gating delay.

Figure 33A:
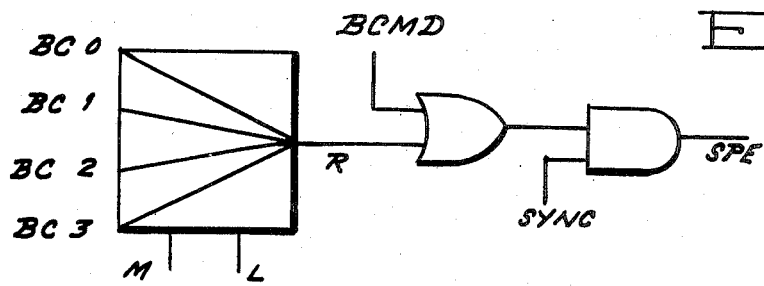
FIG. 33a illustrates a four input multiplexer.
Figure 33B:
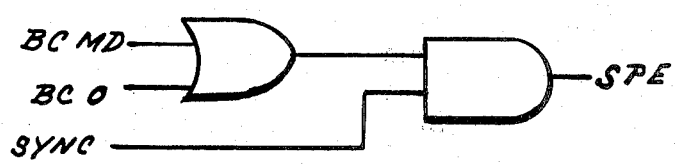
FIG. 33b illustrates a series OR/AND gate.
Figure 33C:
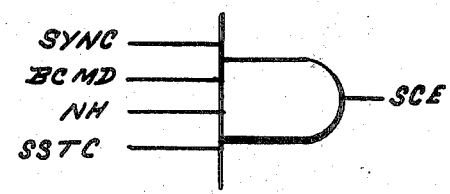
FIG. 33c illustrates a four input AND gate.
Figure 33D:
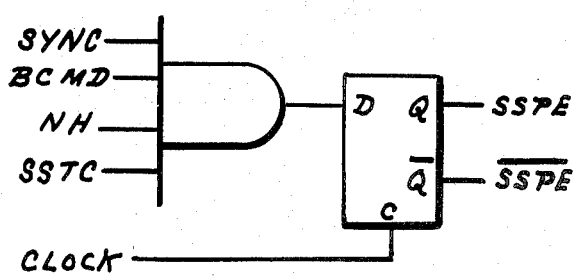
FIG. 33d illustrates a D type flip flop.

When flip flops, counters, registers, or other elements are implemented using count cells, UTA branch and increment logic may be used concurrently to implement the SSI function shown in FIGS. 33a, 33b, 33c and 33d. The multiplexer shown in FIG. 33a has two enable levels. Multiplexed data may be complemented or passed by appropriate BCMD and SYNC control inputs. Additional SPE and SCE functions are shown in FIGS. 33b and 33c, and as indicated in FIG. 33d the SSPE flip flop may be used independently.

While the invention has been described in its preferred embodiments, it is understood that the words which have been used are words of description rather than words of limitation and that changes within the purview of the appended claims may be made without departing from the scope and spirit of the invention in its broader aspects.

What is claimed is:

1. In a timing and control network having clock means and in which branch address, branch condition, branch command, synchronization, terminal count input, terminal count output, count enable, parallel enter, L1, L2, H1 and H2 data, select, substate terminal count, no hold, state count enable, complemented parallel entry, uncomplemented parallel entry, state parallel entry and Q state signals are developed and utilized each through single line access, the improvement residing in a universal timing array, said universal timing array being comprised of a single, large scale, integrated circuit having a multiplicity of 2-bit counter means operating on said clock means, each said 2-bit counter means being controlled by parallel entry, first, second and third enable, and first and second terminal count input control signals, each said 2-bit counter means generating a terminal count output and first and second state Q signals, a parallel data entry multiplexer for each 2-bit counter means, each said multiplexer receiving L1, L2, H1 and H2 data signals and selecting either L1 and L2 or H1 and H2 data in response to a select signal for input to its associated 2-bit counter means, a branch and increment logic circuit operating on said clock means, said branch and increment logic circuit receiving synchronization, branch command, branch condition, substate terminal count and no-hold signals and outputting a state count enable signal, complemented and uncomplemented parallel entry signals and state parallel entry signals, and a branch and increment logic circuit input multiplexer, receiving first, second, third and fourth branch condition signals and first and second branch address signals, said branch and increment logic circuit input multiplexer selecting branch condition signals in response to said first and second branch address signals for input to said branch and increment logic circuit.

2. A universal timing array as defined in claim 1 having first, second, third and fourth 2-bit counter means.

3. A universal timing array as defined in claim 2 wherein said clock means provides a first clock signal to said first and second 2-bit counter means and a second clock signal to said third and fourth 2-bit counter means and to said branch and increment logic circuit means.

4. A universal timing array as defined in claim 3 wherein each 2-bit counter means has a functional logic circuit comprising buffer gating means receiving parallel entry, first, second and third count enable and select input control signals and providing complemented and uncomplemented control signals, first and second 1-bit counter elements, each one bit counter element comprising a master-slave flip flop means and a control gate means, each said control gate means receiving said complemented and uncomplemented control signals from said buffer gating means and said L1, L2, H1 and H2 data input signals and controlling its associated master-slave flip flop means in response thereto, each said master-slave flip flop means receiving clock signals from said clock means and providing an output signal Q and a complemented output signal $\bar{Q}$, a first OR gate means receiving terminal count input signals, and a second OR gate means receiving the output of said first OR gate and the complemented outputs $\bar{Q}$ of said master-slave flip flop means and providing a terminal count output signal in response thereto.

5. A universal timing array as defined in claim 4 wherein said second 1-bit counter element is slaved to said first 1-bit counter element.

6. A universal timing array as defined in claim 5 wherein said buffer gating means comprises a third OR gate receiving said parallel entry signals and providing complemented and uncomplemented parallel entry signals, a fourth OR gate means receiving said select input signals and providing complemented and uncomplemented select signals, and a fifth OR gate receiving said count enable input signals and providing a complemented count enable signal, and each said control gate means comprises first, second, third and fourth AND gates, sixth and seventh OR gates and an exclusive OR gate, said first AND gate receiving said master-slave flip flop means output Q and the uncomplemented parallel entry signal, said second AND gate receiving the complemented count enable signal and said uncomplemented parallel entry signal, said third AND gate receiving an H data signal, said uncomplemented select signal and said complemented parallel entry signal, said fourth AND gate receiving said complemented select signal, an L data signal and said complemented parallel entry signal, said exclusive OR gate receiving the outputs of said first and second AND gates, said sixth OR gate receiving the outputs of said third and fourth AND gates, and said seventh OR gate receiving the outputs of said exclusive OR gate and said sixth OR gate and providing an input to said master-slave flip flop means.

7. A universal timing array as defined in claim 3 wherein said branch and increment logic circuit has a functional logic circuit design comprising first, second and third OR gate means, first, second, third, fourth, fifth and sixth AND gate means, and a master-slave flip flop means, said first and second OR gate means receiving branch address signals and outputting complemented branch address signals, said first AND gate means receiving the complemented branch address signals from said first and second OR gate means and a branch command signal, said second AND gate means receiving the complemented branch address signal from said first OR gate means, an uncomplemented branch address signal and a branch condition signal, said third AND gate means receiving an uncomplemented branch address signal, the complemented branch address signal from said second OR gate means and a branch condition signal, said fourth AND gate means receiving an uncomplemented branch address signal and a branch condition signal, said fifth AND gate means receiving a branch command signal, a synchronization signal, a no-hold signal and a substate terminal count signal and outputting a state count enable signal, said third OR gate receiving the outputs of said first, second, third and fourth AND gate means and a branch command signal, said sixth AND gate means receiving the output of said third OR gate means and a synchronization signal and outputting a state parallel entry signal, said master-slave flip flop means receiving the output of said fifth AND gate means and a clock signal and outputting a substate parallel entry signal.

8. A universal timing array as defined in claim 6 wherein said branch and increment logic circuit has a functional logic circuit design comprising first, second and third OR gate means, first, second, third, fourth, fifth and sixth AND gate means, and a master-slave flip flop means, said first and second OR gate means receiving branch address signals and outputting complemented branch address signals, said first AND gate means receiving the complemented branch address signals from said first and second OR gate means and a branch command signal, said second AND gate means receiving the complemented branch address signal from said first OR gate means, an uncomplemented branch address signal and a branch condition signal, said third AND gate means receiving an uncomplemented branch address signal, the complemented branch address signal from said second OR gate means and a branch condition signal, said fourth AND gate means receiving an uncomplemented branch address signal and a branch condition signal, said fifth AND gate means receiving a branch command signal, a synchronization signal, a no-hold signal and a substate terminal count signal and outputting a state count enable signal, said third OR gate receiving the outputs of said first, second, third and fourth AND gate means and a branch command signal, said sixth AND gate means receiving the output of said third OR gate means and a synchronization signal and outputting a state parallel entry signal, said master-slave flip flop means receiving the output of said fifth AND gate means and a clock signal and outputting a substate parallel entry signal.

9. A universal timing array as defined in claim 8 wherein the functional logic circuit design of said branch and increment logic circuit and said 2-bit counter means is implemented by means of emitter coupled logic networks.

10. A universal timing array as defined in claim 8 wherein the functional logic circuit design of said branch and increment logic circuit and said 2-bit counter means is implemented by means of emitter coupled logic networks including flip flop means comprised of multiple master latch single slave latch circuits, cascode logic circuits and current switch emitter follower circuits.

11. A universal timing array as defined in claim 6 wherein the functional logic circuit design of each 2-bit counter means is implemented by means of emitter coupled logic networks in which
  said first OR gate means comprises a first current switch emitter-follower circuit,
  said fourth OR gate means comprises a second current switch emitter-follower circuit,
  said fifth OR gate means comprises a third and fourth current switch emitter-follower circuits,
  the master-slave flip flop means of said first 1-bit counter element comprises first, second, third and fourth master latch circuits OR connected to a first slave latch circuit, and
  the master-slave flip flop means of said second 1-bit counter element comprises fifth, sixth, seventh and eighth master latch circuits OR connected to a second slave latch circuit.

12. A universal timing array as defined in claim 7 wherein the functional logic circuit design of said branch and increment logic circuit is implemented by means of emitter coupled logic networks comprising
  first and second cascode logic circuits,
  first, second, third, fourth, fifth and sixth current switch emitter-follower circuit, and
  a master-slave flip flop comprised of a master latch circuit and a slave latch circuit, said first and second cascode logic circuits receiving branch command, branch address, and branch command signals, said first current switch emitter-follower circuit receiving a branch address signal, said third current switch emitter-follower circuit receiving a synchronization signal, said fourth current switch emitter-follower circuit receiving a branch command signal, said fifth current switch emitter-follower circuit receiving a substate terminal count signal and said sixth current switch emitter-follower circuit receiving a no-hold signal, the outputs of said first and second cascode logic circuits being wire AND connected to the outputs of said first current switch emitter-follower circuit and wire OR connected to an output of said third current switch emitter-follower circuit to provide an input to said second current switch emitter-follower circuit, said second current switch emitter-follower circuit outputting a state parallel entry signal and a complemented state parallel entry signal, the outputs of said third, fourth, fifth and sixth current switch emitter-follower circuit being wire AND connected to provide an input to said master-slave flip flop and a state count enable signal, said master-slave flip flop outputting a substate parallel entry signal and a complemented substate parallel entry signal.

13. A universal timing array as defined in claim 8 wherein the functional logic circuit design of said branch and increment logic circuit is implemented by means of emitter coupled logic networks comprising
  first and second cascode logic circuits,
  first, second, third, fourth, fifth and sixth current switch emitter-follower circuit, and
  a master-slave flip flop comprised of a master latch circuit and a slave latch circuit, said first and second cascode logic circuits receiving branch command, branch address, and branch command signals, said first current switch emitter-follower circuit receiving a branch address signal, said third current switch emitter-follower circuit receiving a synchronization signal, said fourth current switch emitter-follower circuit receiving a branch command signal, said fifth current switch emitter-follower circuit receiving a substate terminal count signal and said sixth current switch emitter-follower circuit receiving a no-hold signal, the outputs of said first and second cascode logic circuits being wire AND connected to the outputs of said first current switch emitter-follower circuit and wire OR connected to an output of said third current switch emitter-follower circuit to provide an input to said second current switch emitter-follower circuit, said second current switch emitter-follower circuit outputting a state parallel entry signal and a complemented state parallel entry signal, the outputs of said third, fourth, fifth and sixth current switch emitter-follower circuit being wire AND connected to provide an input to said master-slave flip flop and a state count enable signal, said master-slave flip flop outputting a substate parallel entry signal and a complemented substate parallel entry signal.

14. A universal timing array as defined in claim 13 wherein
  said single large scale integrated circuit comprises a standard LSI universal digital array chip incorporating 48 universal digital cells designated U1 through U48 arranged sequentially left to right and top to bottom on said cell, 8 peripheral current switch emitter-follower circuit cells along the top chip edge designated CS1 through CS8 sequentially left to right and 8 peripheral current switch emitter-follower circuit cells along the bottom chip edge designated CS9 through CS16 sequentially left to right, and wherein:
  said branch and increment logic circuit is implemented by utilizing; cells U6 through U12, respectively, for said first and second cascode logic circuits; call U37 for said first, second and third current switch emitter-follower circuits, cell U43 for said fourth, fifth and sixth current switch emitter-follower circuits, cell U31 for said emitter master latch circuits and cell U25 for said slave latch circuit; and wherein:

said first 2-bit counter means is implemented by utilizing; cells CS12, CS11, CS9 and CS10, respectively, for said first, second, third and fourth current switch emitter-follower circuits, cells U44, U45, U46 and U47, respectively, for said first, second, third and fourth master latch circuits, cell U48 for said first slave latch circuit, cells U38, U39, U40 and U41, respectively, for said fifth, sixth, seventh and eighth master latch circuits and cell U42 for said second slave latch circuit; and wherein said second 2-bit counter means is implemented by utilizing; cells CS13, CS14, CS16 and CS17, respectively, for said first, second, third and fourth current switch emitter-follower circuits, cells U32, U33, U34 and U35, respectively, for said first, second, third and fourth master latch circuits, cell U36 for said first slave latch circuit, cells U26, U27, U28 and U29, respectively, for said fifth, sixth, seventh and eighth master latch circuits, and cell U30 for said second slave latch circuit; and wherein:

said third 2-bit counter means is implemented by utilizing; cells CS1, CS2, CS3 and CS4, respectively, for said first, second, third and fourth current switch emitter-follower circuits, cells U13, U14, U15 and U17, respectively, for said first, second, third and fourth master latch circuits, call U15 for said first slave latch circuit cells U19, U20, U21 and U22, respectively, for said fifth, sixth, seventh and eighth master latch circuits and cell U21 for said second slave latch circuit, and wherein:

said fourth 2-bit counter means is implemented by utilizing; cells CS5, CS6, CS7 and CS8, respectively, for said first, second, third and fourth current switch emitter-follower circuits, cells U1, U2, U4 and U5, respectively, for said first, second, third and fourth master latch circuits, cell U3 for said first slave latch circuit; cells U7, U8, U10, and U11, respectively, for said fifth, sixth, seventh and eighth master latch circuits and cell U9 for said second slave latch circuit.

* * * * *